(12) United States Patent
Hunt

(10) Patent No.: US 6,330,313 B1
(45) Date of Patent: Dec. 11, 2001

(54) COMMUNICATIONS NETWORK

(75) Inventor: Rowland Geoffrey Hunt, Ipswich (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/029,546

(22) PCT Filed: Jan. 14, 1998

(86) PCT No.: PCT/GB98/00106

§ 371 Date: Mar. 5, 1998

§ 102(e) Date: Mar. 5, 1998

(87) PCT Pub. No.: WO98/33333

PCT Pub. Date: Jul. 30, 1998

(30) Foreign Application Priority Data

Jan. 22, 1997 (GB) ................................................ 97300396

(51) Int. Cl.[7] .................................................. H04M 15/00
(52) U.S. Cl. ...................................... 379/133; 379/112.04
(58) Field of Search .................................. 379/112, 113, 379/133, 134, 136, 137, 220, 221, 229, 230, 34

(56) References Cited

U.S. PATENT DOCUMENTS

| | | | | |
|---|---|---|---|---|
| 5,060,258 | * | 10/1991 | Turner ................................. | 379/134 |
| 5,295,183 | * | 3/1994 | Langlois et al. ..................... | 379/113 |
| 5,335,268 | * | 8/1994 | Kelly, Jr. et al. .................... | 379/112 |
| 5,450,483 | * | 9/1995 | Williams .............................. | 379/279 |
| 5,509,063 | * | 4/1996 | Crabtree et al. ..................... | 379/221 |
| 5,778,057 | * | 7/1998 | Amir et al. ........................... | 379/220 |
| 5,933,481 | * | 8/1999 | MacDonald ......................... | 379/137 |
| 6,018,519 | * | 1/2000 | Ginzboorg ........................... | 379/230 |
| 6,084,955 | * | 7/2000 | Key et al. ............................. | 379/220 |

* cited by examiner

*Primary Examiner*—Curtis Kuntz
*Assistant Examiner*—Rexford Barnie
(74) *Attorney, Agent, or Firm*—Nixon & Vanderhye P.C.

(57) ABSTRACT

In a communications network, a count is maintained of the number of calls made to a selected number. The number may be that of an answering center or of any other destination which has the capacity to handle a multiplicity of calls simultaneously. The count is automatically updated when calls are admitted to the number and when they are terminated. If a new call would take the number of calls in progress above a stored value for the maximum capacity of the number, then the call is rejected. In one implementation, resources are allocated dynamically on an Overload Control Server to a particular destination number only when congestion occurs. The stored value for the capacity may be amended automatically depending on the response of the network to admitted calls. The value for the capacity may initially be estimated as a function of the holding times for calls to the destination number.

18 Claims, 8 Drawing Sheets

COMMUNICATIONS NETWORK

BACKGROUND OF THE INVENTION

1. Field of the Invention

The present invention relates to a communications network, and in particular to a method and apparatus for preventing overloads in such a network.

2. Related Art

Some of the most demanding traffic patterns on a telecommunications network relate to the operation of telemarketing call answering centres. For example, the number of a call answering centre might be displayed as part of a nationally broadcast advertisement for a product. This may result in many thousands of calls being made to the number in a short period of time following the advertisement. Such call levels have the potential to overload the network at a number of points, including intermediate DMSU's (digital main switching units) and the destination exchange.

In networks which employ an IN (intelligent network) architecture, it has previously been proposed to equip IN platforms with a call gapping mechanism. This enables the platform to transmit an instruction to a service switching point (SSP) to reduce the rate of inbound calls to the IN platform from the SSP. However, although this mechanism is effective to prevent overloading at the IN platform, it does not in itself provide adequate protection for a destination exchange which is downstream from the platform. The IN platform has a call handling capacity which is typically several times greater than the capacity of an individual exchange. Therefore, long before the call gapping mechanism is invoked to protect the IN platform, the platform may be passing calls to a destination exchange at a rate which is sufficient to bring a risk of software failure at the destination exchange. Even if the destination exchange withstands a sudden peak in traffic and passes the calls on to the answering centre, if the capacity of the answering centre is exceeded then many of the calls will not be completed but will result in a BUSY signal being returned to the caller. Ineffectives, as such calls are known, earn no revenue for the network operator, nor for the answering centre, but add to the network traffic and so have to be supported by the network infrastructure.

In order to prevent overloading of the destination exchange, and to reduce the number of ineffectives, the present applicant has previously proposed mechanisms for controlling call rates on the outward leg from a network platform to a destination exchange. International Patent Application no. PCT/GB 94/02512 discloses and claims an approach in which call levels are monitored and controlled to maintain a predetermined and relatively low level of BUSY signals from the call answering centre. This has helped to ensure that the resources of the answering centre are used effectively while protecting the local exchange from overload. However while it reduces to an extent the number of ineffectives on the network, a significant number remain. Furthermore, since a predetermined number of excess calls are admitted for each answering centre, the total number of ineffectives rises when call answering is distributed over several centres.

SUMMARY OF THE INVENTION

According to a first aspect of the present invention, there is provided a method of operating a communications network including steps of:

a) maintaining, for a selected destination number which has the capacity to receive a multiplicity of calls, a count of the number of calls currently in progress;

b) automatically updating the said count when calls are admitted to the selected destination number and when calls are terminated;

c) storing a value for the maximum capacity of the selected destination number;

d) when a new call is made to the destination number comparing the count of the number of calls in progress and the said value for the maximum capacity and rejecting the new call when admitting the call would cause the maximum capacity to be exceeded.

The term "selected destination number" as used herein encompasses both a single number, e.g. 0800 400 496, or a selected group of numbers or a range of numbers, e.g. 0800 400 * where * may be any three digits.

The present invention adopts a new approach to controlling call levels to a destination number, such as the number of an answering centre. Instead of relying solely upon the generation of a certain rate of BUSY signals, the capacity, that is the maximum number of simultaneous calls, and the current state of the destination number are modelled within the network, for example at an answering centre server located at an IN platform. Then, as soon as it is ascertained that the full capacity of the answering centre is in use, any further calls are released or redirected rather than being passed to the local exchange. This ensures good use of the capacity of the answering centre while reducing the number of ineffectives to negligible levels.

Preferably the method further comprises:

e) subsequently amending, in dependence upon the response of the network to an admitted call, the value for the maximum capacity which was stored in step (c).

The present inventor has found that the efficiency of the call control process is enhanced significantly by allowing the value for the capacity to be amended based upon feedback from the network. This allows the process to adapt automatically to changes in capacity, and removes the need for the value of the capacity to be determined with complete accuracy at the outset.

Preferably step (c) includes:

estimating the maximum capacity of the destination number and storing the estimated value. Preferably the step of estimating the capacity includes:

for a period of time, monitoring the number of calls $N_C$ to the number which are completed, and recording the time $T_C$ taken to complete each of the calls; and calculating an estimate for the capacity from the mean holding time for calls to the number, where the mean holding time is derived from the values of $N_C$ and $T_C$ which are recorded during the said period of time.

This preferred feature of the invention minimises the amount of data and signalling which is required in order to support the modelling of the answering centre or other destination number. Instead of storing data on the capacity of every answering centre, and having to update manually that data every time the capacity of a centre changes, the model may go through a training process in which an initial estimate of answering centre capacity is calculated. During the training process, either all offered calls are admitted to the answering centre, or at least a significant excess of calls are admitted above the answering centre's answering rate capability. On completion of the training process, in a preferred implementation, the system enters a tracking mode in which an offered call is admitted only if its admission will not cause the current calls-in-progress total to exceed the current estimate of answering centre capacity. In addition, in tracking mode, the invention may adapt its current estimate of answering centre capacity in response to signalling from the network which conveys information about the status of the destination. This tracking process may, for example, rely upon detecting when the destination number responds with a BUSY signal. When this occurs, then the estimated value may be decremented. Conversely, if a new call is admitted when the estimated capacity has already been reached, and if the new call is connected rather than a BUSY signal being returned, then the estimated value for the capacity may be incremented.

Preferably, steps (a) to (d) are initiated only when congestion is detected at the destination number. Preferably steps (a) to (d) are carried out at a single server which serves a plurality of the said selected destination numbers, and in which resources for carrying out steps (a) to (d) are allocated on the server to a respective destination number when congestion is detected at the said destination number.

The efficiency of the monitoring process is further maximised by allocating resources to monitoring a particular number dynamically and automatically, as and when a number becomes congested. The trigger may be, for example, the first BUSY signal which is returned by the answering centre. This approach ensures that monitoring is carried out only when it is needed, and that the associated signalling overhead on the network is kept to a minimum. It makes it possible to achieve levels of efficiency such that a single monitoring centre, or a small number of such centres, can serve all the answering centres in the UK PSTN.

In order to estimate answering capacity as quickly as possible, in a time comparable with or less than the call holding time, preferably an estimate is made of the call holding time. Preferably the mean holding time of calls made to the number is derived from the relationship:

$$\hat{T}_H = \frac{\sum_{N_C} T_C + \sum_{N_I} T_I}{N_C}$$

where $\hat{T}_H$ is the estimated mean holding time, $T_C$ is the time taken to finish a monitored call which has ended, $N_C$ is the number of such calls, $T_I$ is the time taken so far by a monitored call which has yet to end, and $N_I$ is the number of such calls. This result is true for calls whose holding time has a negative-exponential distribution. This is approximately the case for the population of calls on the whole of a national network. Sometimes, however, subsets of that population may have different distributions. For example, for telephone voting, or for telephone calls for the purpose of making credit card donations, the holding time may be predetermined and generally fixed. For this type of deterministic distribution preferably the following relationship is used to determine the mean holding time:

$$\hat{T}_H = \frac{\sum_{N_C} T_C}{N_C}$$

According to a second aspect of the present invention, there is provided a call control server suitable for use in a communications network which comprises a plurality of interconnected nodes arranged to provide connections between terminal resources, the call control server comprising:

a) a call counter which is assignable to a selected destination number and which is arranged to maintain a count of the total number of calls in progress to the destination number;

b) a network signalling interface arranged to receive network signals which are generated when calls to the selected destination number are completed;

c) a counter controller which is connected to the network signalling interface and to the call counter and which is arranged, in response to the said signals received at the network signalling interface, to update automatically the count which is maintained by the call counter;

d) a store which is programmed with a value for the capacity of the selected destination number; and e) a call controller which is connected to the call counter and to the store and which includes
 - a comparator for comparing the value of the call counter and the value programmed in the said store; and
 - a control signal generator, arranged, when connection of a new call would cause the capacity of the destination number to be exceeded, to generate a control signal to cause the new call to be rejected without being routed to the destination.

According to a third aspect of the present invention, there is provided a communications network comprising:

a) a plurality of interconnected nodes arranged to provide connections between terminal resources; and b) a call control server in accordance with the second aspect.

BRIEF DESCRIPTION OF THE DRAWINGS

Embodiment of the invention will now be described in further detail, by way of example only, with reference to the accompanying drawings in which.

DETAILED DESCRIPTION OF EXEMPLARY EMBODIMENTS

A telecommunications network which uses an IN (Intelligent Network) architecture includes a service control point 1, which is also termed herein the Network Intelligence Platform (NIP). The service control point 1 is connected to trunk digital main switching units (DMSU's) 2, 3 and to digital local exchanges (DLE's) 4,5. Both the DMSU's and the DLE's function as service switching points (SSP's). At certain points during the progress of a call, the SSP's transfer control of the call to the service control point. The service control point carries out functions such as number translation and provides a gateway to additional resources such as a voice messaging platform. In addition, in this embodiment of the present invention, the SCP incorporates an answering centre server (ACS) 100.

Figure 6:
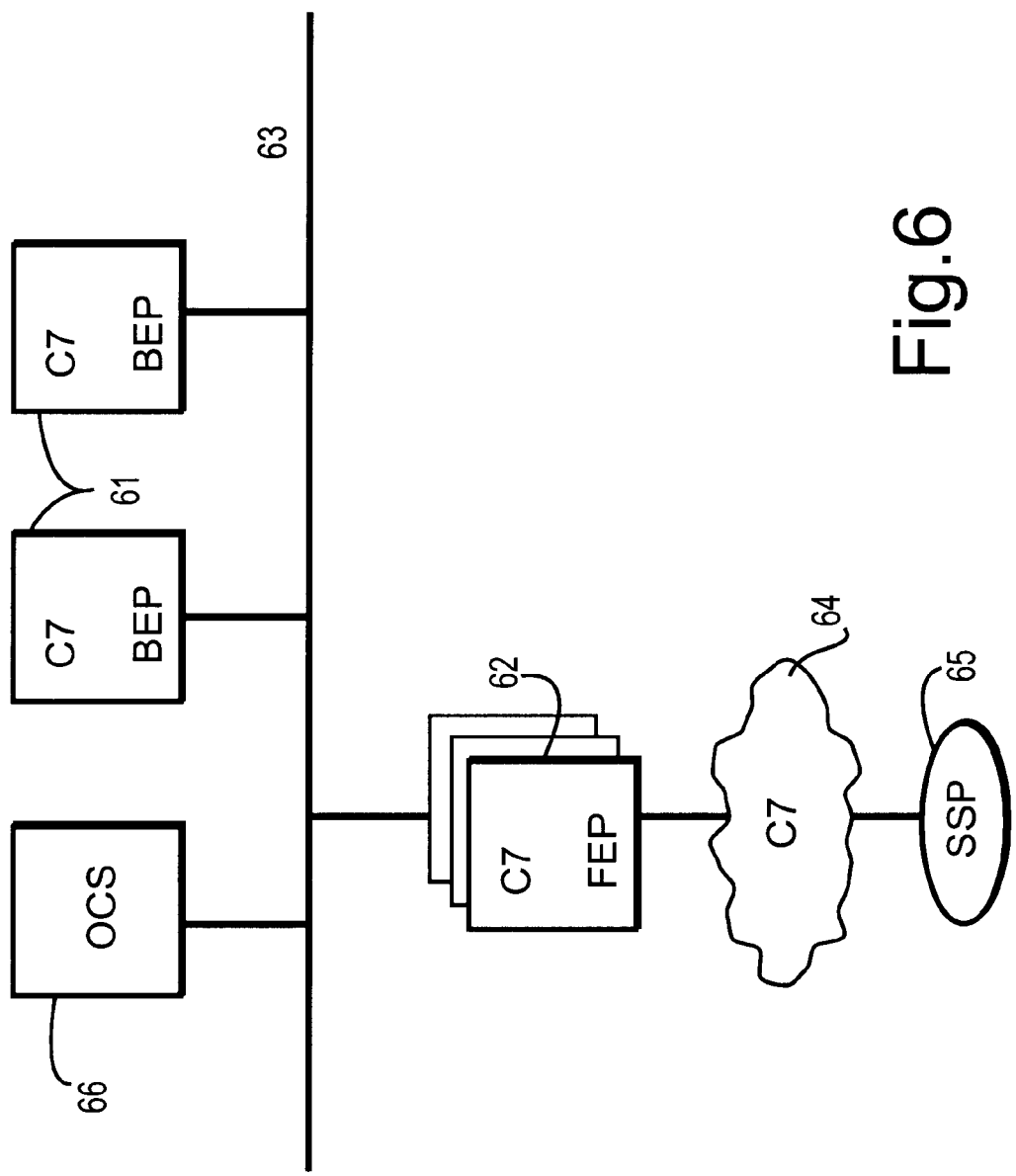
FIG. 6 is a schematic of a network showing in further detail the architecture of a service control point (SCP)

FIG. 6 shows in further detail one possible architecture for the SCP. In this example, the SCP comprises a number of C7 front end processors (FEPs) 62 and back end processors (BEPs) 61 which are connected by an FDDI LAN 63. An overload control server (OCS) 66 which incorporates the ACS is also connected to the FDDI LAN 63. Signals from an SSP 65 are communicated via a C7 signalling network 64 to a respective one of the front end processors. A new call is allocated to one of the back end processors. Incoming calls may be allocated to each BEP in turn, or the allocation may be determined by a load sharing algorithm.

Figure 7:
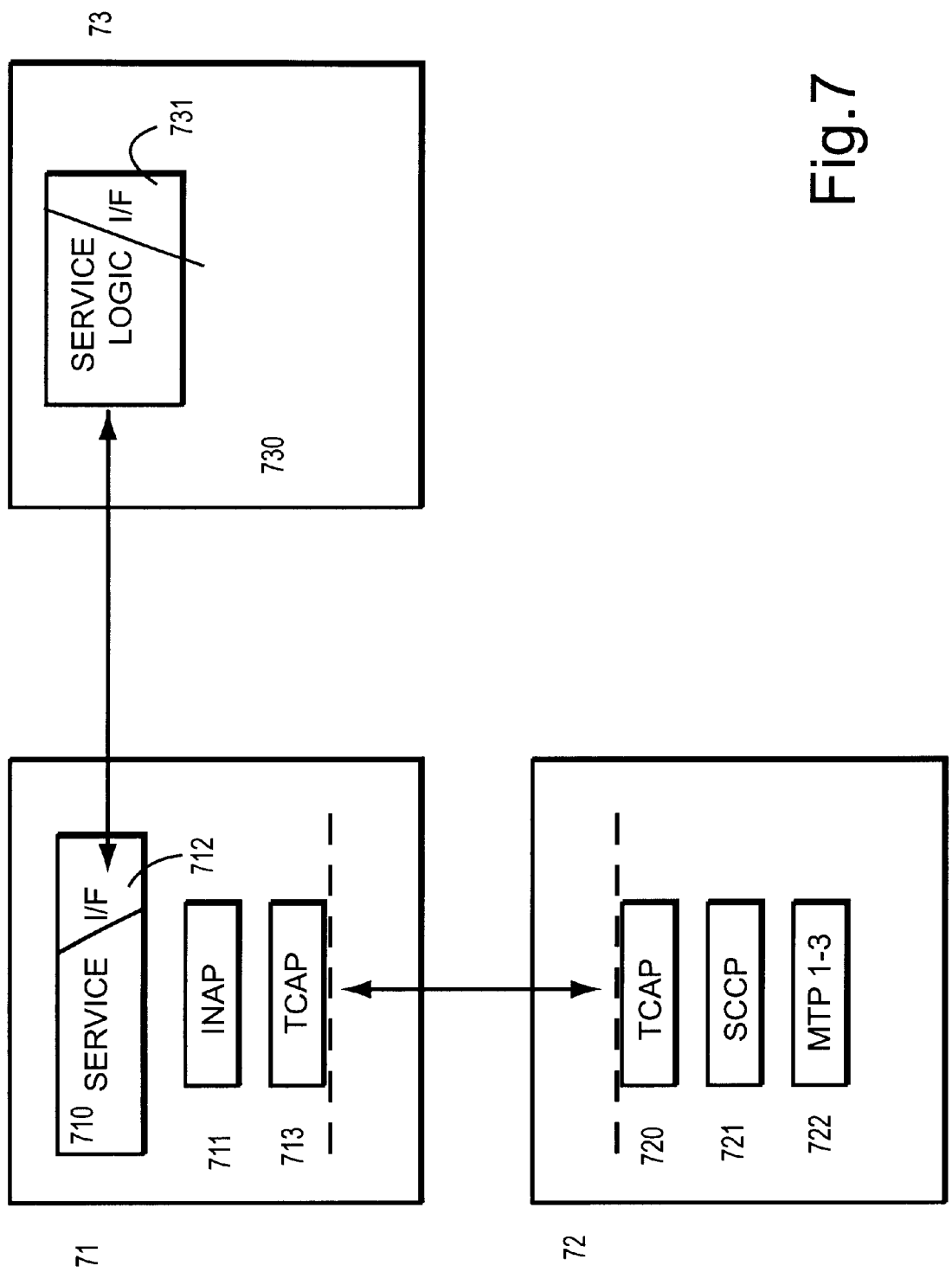
FIG. 7 is a diagram showing the different protocol layers in the SCP of FIG. 6.

FIG. 7 shows the different protocol layers in the BEP and FEP. In this example two types of BEP are used: a transaction server 71 and an advanced transaction server 73. The advanced transaction server includes service logic 730 which implements advanced service features and which is interfaced to the service layer 710 of the transaction server 71. The service layers in the transaction server and in the advanced transaction server both include an interface 712, 731 to the ACS. Alternatively, the ACS interface may be located in the INAP (Intelligent Network Application Part) layer 711 of the transaction server. A TCAP layer 713, 720 is split between the BEP 71 and FEP 72. The FEP 72 also includes an SCCP signalling layer 721 and an MTP transport layer 722.

Figure 1:
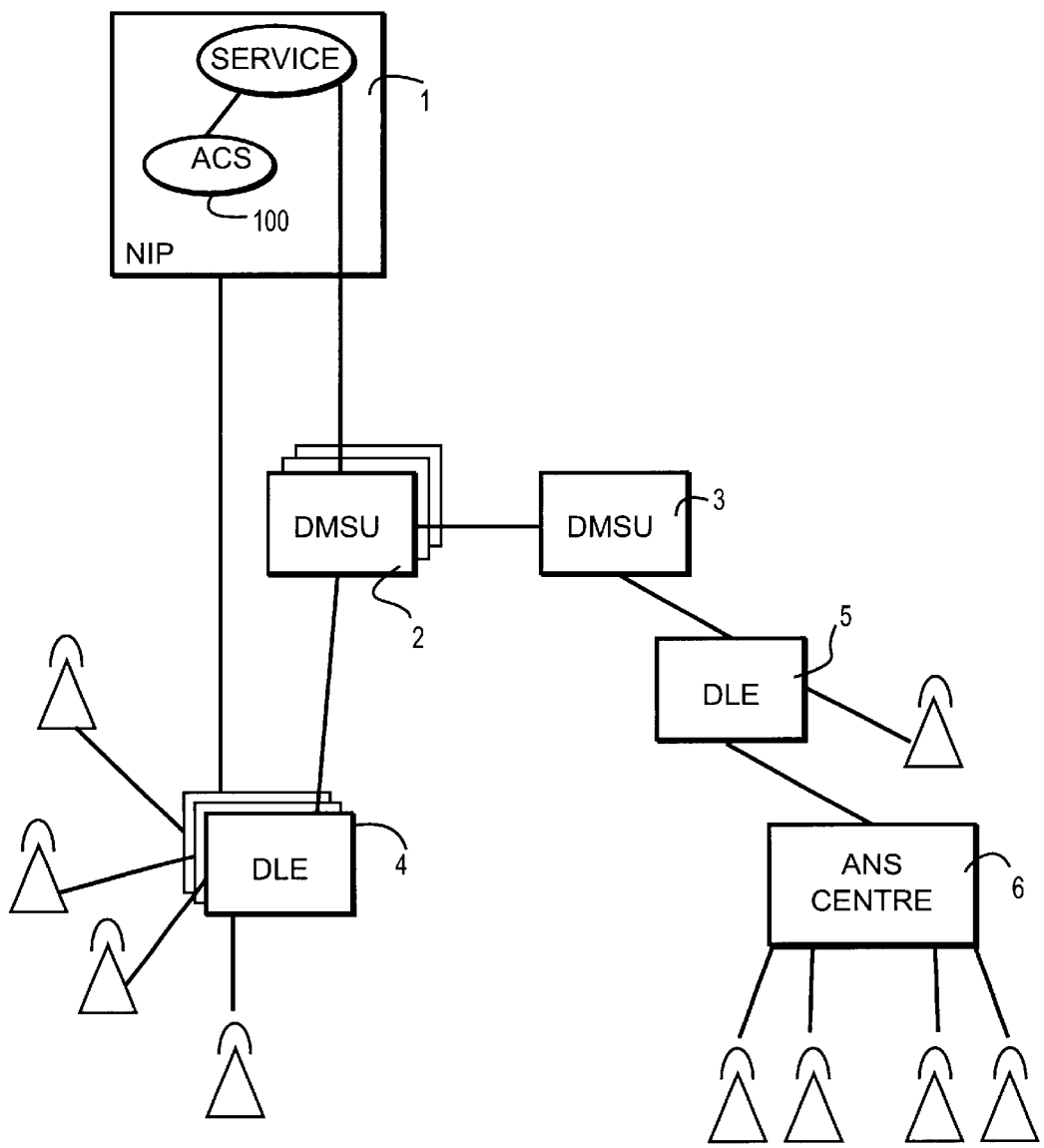
FIG. 1 is a schematic of a network embodying the present invention.

As illustrated in FIG. 1, a call answering centre 6 is connected to a DLE 5. In this example, the call answering centre has a single telephone number, e.g. 0800 400 496 and the capacity to handle 50 simultaneous calls. Although for ease of illustration only a single call answering centre is shown, in practice the SCP may be connected, via DSMU's and DLE's, to many such call answering centres. For example, it is envisaged that in the UK PSTN one SCP/ACS will support several hundreds of answering centres. In the ACS, an instance of a call control process for a given call answering centre is created only when the call answering centre becomes congested. To avoid the signalling overheads which would be incurred if every call were monitored, the ACS samples calls intermittently. For example, the ACS may select one call every 10 seconds. For the selected call, the ACS sets a detection point at the originating SSP which is triggered if a BUSY signal is returned from the DLE for a call to the answering centre number, 0800 400 496. In response to the trigger, an instance of the call control process is created for that number. As further described below, a counter which records the total number of calls in progress to the number is initiated. An estimate is made of the total capacity of the centre, and this value is stored. This estimate may be derived in an initial training phase, prior to the call control process taking control over whether calls are admitted. After the completion of the training phase, when a subsequent call is made to the answering centre, for example from a subscriber connected to DLE 4, a request for processing is passed from the service control function in the SCP to the answering centre server. The answering centre server compares the value for the capacity of the server with the value of the counter. If the total number of calls in progress (excluding the new call) is less than the value for the capacity of the answering centre, then the call is admitted and the counter is incremented to reflect the additional call in progress. This is signalled by the answering centre server to the service control function. The call is then progressed conventionally. At the same time, the answering centre sets detection points for the following termination events: busy, RTNR (ring tone, no reply), Abandon, Answer, Disconnect, Route Select Failure. When any of these termination events occur, this is signalled via the SCF/ACS interface, and the counter is decremented by one. Whenever a further call is received, these steps are repeated, and if the call is admitted the counter is again incremented. Further iterations of this process are carried out, until the number of calls in progress corresponds to the value for the capacity of the answering centre. Then when a further call is received, the condition that the number of calls in progress should be less than the capacity is not met. In this case, the server causes the SCP to send a ReleaseCall message to the originating exchange. This message may include a reason for the failure to complete the call, namely user busy. It should be noted that by contrast with the functioning of a conventional network, in which the BUSY signal would have been returned from the destination DLE, the call never progresses beyond the originating SSP and the SCP. The call does not make any contribution to the traffic in the destination exchange, and so infrastructure at the destination exchange does not have to be designed to support calls originating in these circumstances.

The ACS causes the SCP to send a ReleaseCall if the SCP would not be able to redirect this call if it fails at the controlled destination. This is the case when the SCP has set no detection points in "interrupting" mode for the call. Alternatively, when interrupting detection points have been set, the ACS causes the SCP to behave just as if a "real" Busy indication had been received from the network. Where detection points have been set in "notify and continue" mode, the ACS is arranged to signal to the SCP that a real event report of the appropriate type, e.g. BUSY, has been received.

Figure 2:
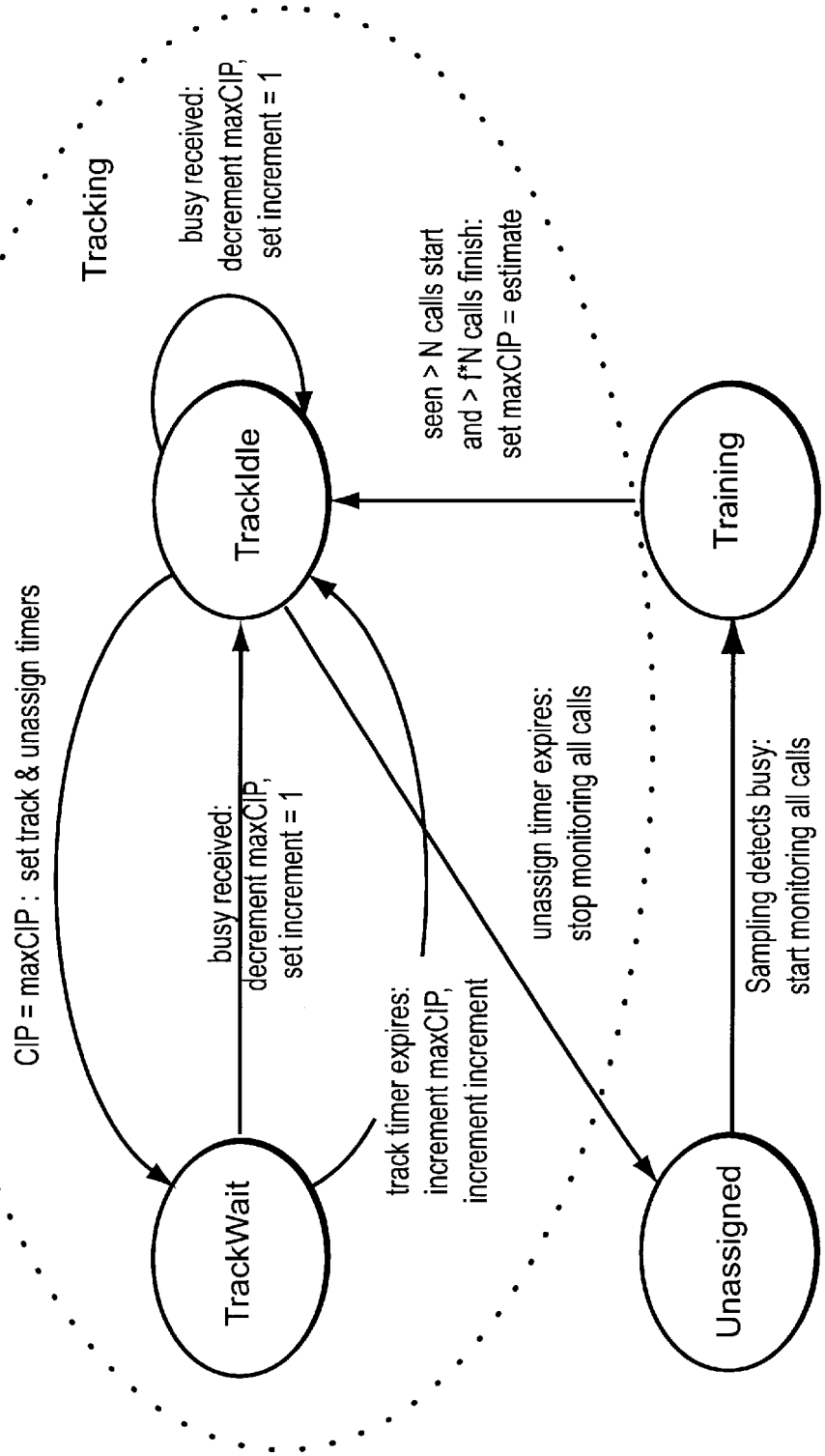
FIG. 2 is a state diagram for the answering centre server of FIG. 1.

FIG. 2 is a state machine representation of an instance of the control process in the ACS. In the await Timeout and Idle states the ACS is actively controlling call levels, receiving requests for permission to admits calls, and reporting on the outcomes of admissions. Prior to entering these states, the ACS process is initiated in the Training state, which is used to set the estimate of the capacity of the answering centre. In the Training state the ACS does not restrict calls to its allocated destination, but causes the SCP to set detection points at the originating SSP for all calls to the destination. It maintains records for those calls in progress which it is monitoring. In this state the objective is to estimate the capacity of the answering centre as quickly as possible, to allow the ACS to move into the Tracking mode in which it actively controls admission of calls. In order to estimate answering capacity as quickly as possible, in a time comparable with or less than the call holding time, an estimate is made of the call holding time. This is obtained as follows: the mean holding time of calls made to the number is derived from the relationship:

$$\hat{T}_H = \frac{\sum_{N_C} T_C + \sum_{N_I} T_I}{N_C}$$

where $\hat{T}_H$ is the estimated mean holding time, $T_C$ is the time taken to finish a monitored call which has ended, $N_C$ is the number of such calls, $T_I$ is the time taken so far by a monitored call which has yet to end, and $N_I$ is the number of such calls. As described in the introduction above, this result is true for calls whose holding time has a negative-exponential distribution. This is approximately the case for the population of calls on the whole of a national network. Sometimes, however, subsets of that population may have different distributions. For example, for telephone voting, or, for telephone calls for the purpose of making credit card donations, the holding time may be predetermined and generally fixed. For this type of deterministic distribution preferably the following relationship is used to determine the mean holding time:

$$\hat{T}_H = \frac{\sum_{N_C} T_C}{N_C}$$

The ACS maintains a total of the call holding times for the calls which it has seen start and complete, and a count of those calls. The ACS may also calculate the number of calls, and total call holding times so far, of calls which it has seen start and which are still holding. A criterion is set which allows sufficiently accurate estimate of answering centre capacity to be formed: for example, it may be required that at least 20 calls are seen to start, and of those which have started, at least half have completed. Once the criterion is met, the method described below allows calculation of an estimate of answering centre capacity from the gathered data, and the ACS may enter the Tracking mode (containing the states AwaitTimeout and Idle).

When an answering centre server is first allocated to an overloaded answering centre, it causes IN detection points to be set at the originating SSP on all calls admitted to the destination. For each call, detection points are set for all possible outcomes of the call set-up phase (Answer, Abandon, Route Select Failure, Ring Tone No Reply) and for Disconnect. Thus the answering centre server will have complete knowledge of the outcome of those calls to the destination which were admitted after the answering centre server was allocated to the answering centre. However, it will have no knowledge of individual calls originated before it was allocated. The answering centre server may however infer that the answering centre was fully occupied at the time when the server was allocated to the centre, because one (sampled) call had returned a Busy event report. Let the answering centre server be allocated to the answering centre at time t=0, and let the answering centre have capacity N lines. For simplicity, assume that the call arrival rate was approximately constant for in the period leading up to the allocation (this cannot be exactly true because the answering centre has just entered overload, but will be approximately true provided the rise time of the varying call arrival rate is greater than the call holding time). Then for negative-exponential call holding times the number of calls which started before t=0 and which are still holding will be:

$$N_H(t) = N \exp(-t/T_H)$$

Hence the expectation value of the number of calls in progress which originated after allocation, i.e. those for which the answering centre server has set detection points and which are therefore known to the answering centre, will be:

$$N_K(t) = N - N_H = N(1 - \exp(-t/T_H))$$

and an estimate of the capacity of the answering centre is:

$$\hat{N} = N_K(t)/(1 - \exp(-t/\hat{T}_H))$$

For deterministic (constant) call holding times, the number of calls which started before t=0 and which are still holding will be:

$$N_H(t) = N(1 - (t/T_H)) \text{ for } t < T_H$$

The number of known calls will be:

$$N_K(t) = N - N_H = Nt/T_H \text{ for } t < T_H$$

and an estimate of the capacity of the answering centre for deterministic call holding times is:

$$\hat{N} = N_K(t)\hat{T}_H/t$$

Once the value for the capacity has been set by the training process, it remains necessary to adapt the value to any changes in the capacity which may subsequently occur. Step changes in capacity may occur, for example, as a number of call answering agents at the answering centre is increased or decreased. The state machine functions as follows to track any such changes. In normal operation, when the number of calls in progress is less than the maximum capacity, the system is in the Idle state. If a BUSY is received in Idle this indicates that the value for the capacity is too high, and accordingly it is decremented. The transition from the Idle state to the Await Timeout state is predicated on the condition that the number of calls in progress is equal to the current value for the capacity. When this transition is made, a timer is set which runs, e.g., for 10 seconds. If this period elapses without a busy signal being received from the number, then it is assumed that the current value for the capacity is either correct or is too low. Accordingly this value is incremented. At the same time, the system returns to the Idle state. Alternatively, if a busy signal is received while the system is in the Await Timeout state, then a transition is made to the Idle state and the value for the capacity is decremented.

When the answering centre is operating at full capacity, but the capacity remains constant, the ACS causes the generation of a single ineffective call on each expiry of the timer. This ineffective call is necessary to establish that the capacity has not increased, i.e. to permit tracking of changes in capacity. Thus the duration of the timer is a compromise to achieve a sufficiently low rate of admitted ineffective calls, and sufficient responsiveness in the ACS's tracking of changes in answering centre capacity Optionally, whenever a timeout transition is made, at the same time as the capacity is incremented, the value of the relevant increment may itself be increased. For example, at the first such transition the value for the capacity might be incremented by one, and the value of the increment itself incremented by one, so that at the next such transition the value for the capacity is increased by 2. When a busy signal is next received, the value for the increment is reset to 1. Other schemes are possible—for example one in which the increment is doubled each time it is successfully applied. This alternative scheme is able to track large changes more swiftly, and might be used when a large answering centre is expected to change the number of call answering agents by many tens or hundreds over a period of a few minutes.

If a BUSY is received following an increment of the capacity estimate by more than 1, then the ACS may, for example: (a) replace the current capacity estimate by the current calls in progress; and (b) reset the increment to 1. Any further busy events received (due to outstanding calls admitted when the capacity estimate exceeded true capacity) further decrement the capacity estimate.

In the first scheme described above, the ACS achieves a parabolic adaptation of its call limits described by $a+bt+ct^2$, where t is the time take to adapt and a, b and c are constants. This enables the ACS to deal, for example, with the case where a large block of extra lines is added to the answering centre to deal with an anticipated traffic surge.

The ACS is de-allocated when the call level to the number falls well below the capacity of the answering centre. To this end, whenever the calls in progress equals the estimated capacity a second (deallocation) timer is started or restarted.

The deallocation timer is of longer duration than the 10 s timer already introduced above—it may have duration of perhaps one to several minutes. When it expires, the centre has not been at capacity for the timer duration, and the ACS may be deallocated.

In an alternative and preferred approach to deallocation, the deallocation timer is started or restarted whenever a call clears and the number of calls in progress drops from the current maximum number of calls in progress (MCIP) to a value equal to MCIP−1. This is preferred as ensuring that deallocation does not occur while the monitored answering centre is still operating at full capacity, as can occur with the first scheme above if the call holding time is greater than or approximately equal to the duration of the deallocation timer.

An implementation of the ACS will now be described in further detail.

In this example, the ACS forms part of an overload control server (OCS) and a single OCS is included in each NIP in the network. Other arrangements are possible: for example, a NIP may include more than one OCS, or a single OCS may serve several NIP's. However the use of a single OCS in which outbound control for the NIP is localised is preferred. By contrast with implementations in which independent transaction servers in the SCP maintain independent call control schemes, the use of a single monitor and control process ensures that there is a higher aggregate rate of event arrivals, and therefore can provide a faster control response. This arrangement also delivers smoother call arrivals to the answering centre, reduces the impact of overload control processing on other NIP processes, facilitates communication with overload control processes on other sites, and makes it possible to offer a simple interface to Call Processing or to a TCAP server.

The OCS/ACS may be implemented on a cluster of UNIX microprocessors. A suitable system is available commercially from Digital Equipment Corporation as Trucluster (Trade Mark). This uses a scheme known as "memory channel" or "reflective memory" to provide fast communication between different processors. Memory-to-memory connections between processors offer very high bandwidth, low latency and low signalling overheads and so make it possible to support a large number of overload control objects in real time on a single overload control platform.

Figure 3:
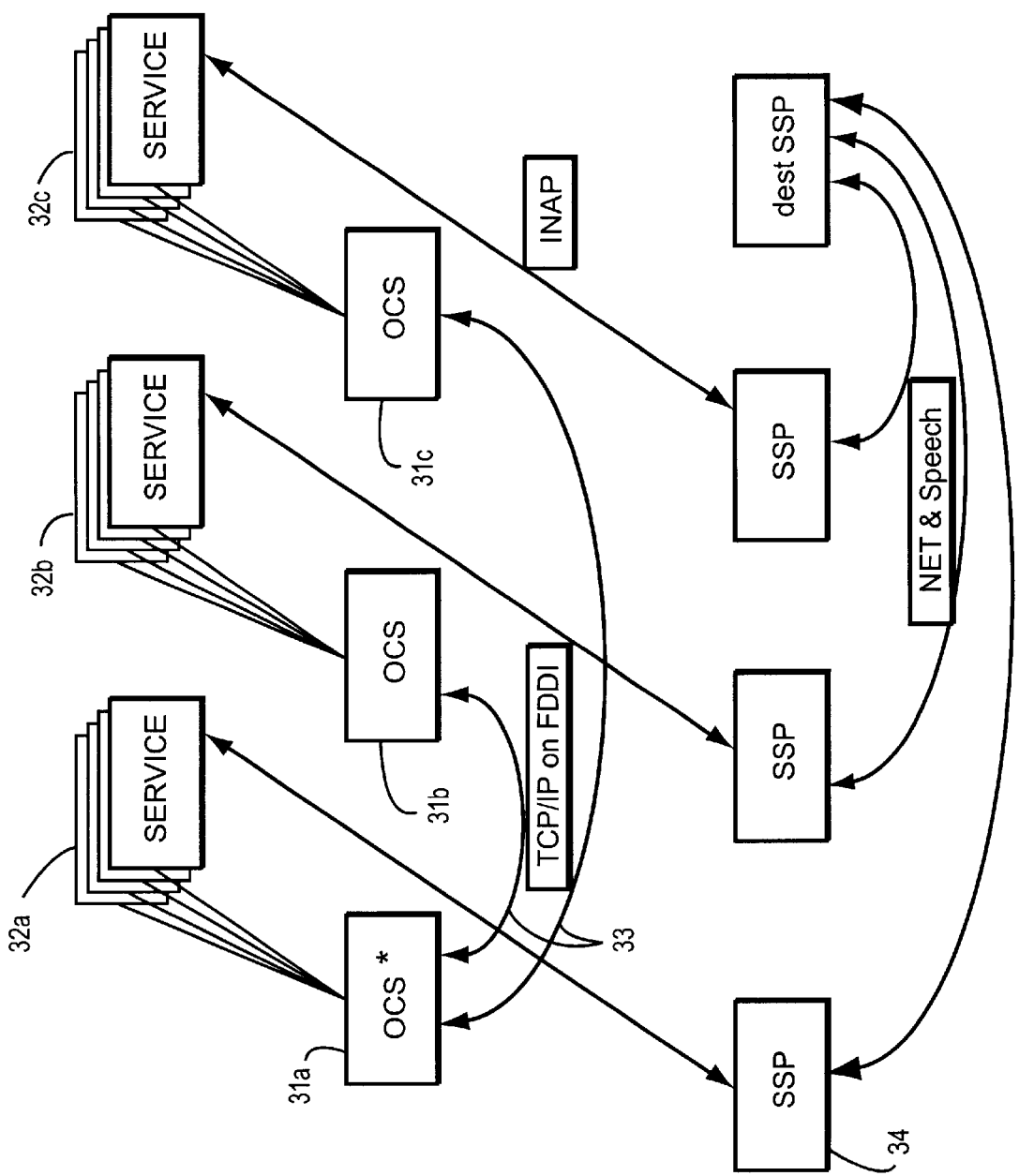
FIG. 3 is a schematic of a network including a plurality of answering centre servers.

As well as inter-process communication in the OCS, signalling is used between OCS platforms at different sites. As shown in FIG. 3, this is implemented using TCP/IP protocols on an FDDI WAN 33. Any OCS at any site may become an ACS for any answering centre. The Figure shows three Overload Control Servers 31a–c which are associated with service control functions 32a–c. The service control functions communicate with respective service switching points 34 via INAP (Intelligent Network Application Part) signalling channels. When an ACS instance is created at an OCS, for example at the OCS which is referenced 31a in FIG. 3, that OCS signals to other OCSs via the FDDI WAN 33 that it now controls that answering centre. It can be shown that for three OCSs handling telemarketing traffic at total levels which are typical of the UK national network, the bandwidth required for communication between the OCS platforms in connection with the ACS is around 220kbit/s.

The ACS, and other functions of the OCS, are provided with an interface to Call Processing. That interface may be implemented, in the context of an object oriented design and programming environment, as two methods— admitCallquery, and eventReport. These methods are defined as follows:

obc_admitCallQuery(callId, destinationid): goAndReports

This method is invoked by the Service before sending a call to a destination. The outbound control returns a Boolean indicating whether the call should be admitted.

If the call should be admitted, then the outbound control also indicates which event reports should be requested for the call. The service treats the event reports requests as follows: all overload-control requested reports are requested as notify-and-continue reports, unless the Service has already determined that it must request a given report as an interrupting report, for example as part of the function of a divert on busy call plan.

If the outbound control has determined that the call should not be admitted then it also returns a reason, e.g. Busy, Route_Select_Failure, or possibly No_Answer. The Service on receiving this reason behaves exactly as if the same reason had been returned in an event report from the answering centre itself. The service may, e.g., try the next terminating node in a divert-on-busy chain, or may return ReleaseCall to the originating SSP.

If an event report is requested by outbound control and the Service subsequently receives that event report for the call it should invoke the second method:

obc_eventReport(callId, event): null which indicates to the outbound control that the event has occurred for the specified call.

These interfaces enable low-fraction sampling, looking for answering centres becoming busy, Automatic Call Restriction (ACR) outbound control and dynamic allocation of an ACS. As discussed above in relation to FIG. 7, the ACR interface forms part of the service layer of transaction servers and advanced transaction servers in the SCP. Different instances of the service logic address the ACR interface, which in turn communicates queries and event reports to the ACS. The ACS may be located at the local Overload Control Server for the site, or it may be located at a different site, in which case the local OCS extends the interface through to the remote site over, e.g., a TCP/IP connection.

Figure 8:
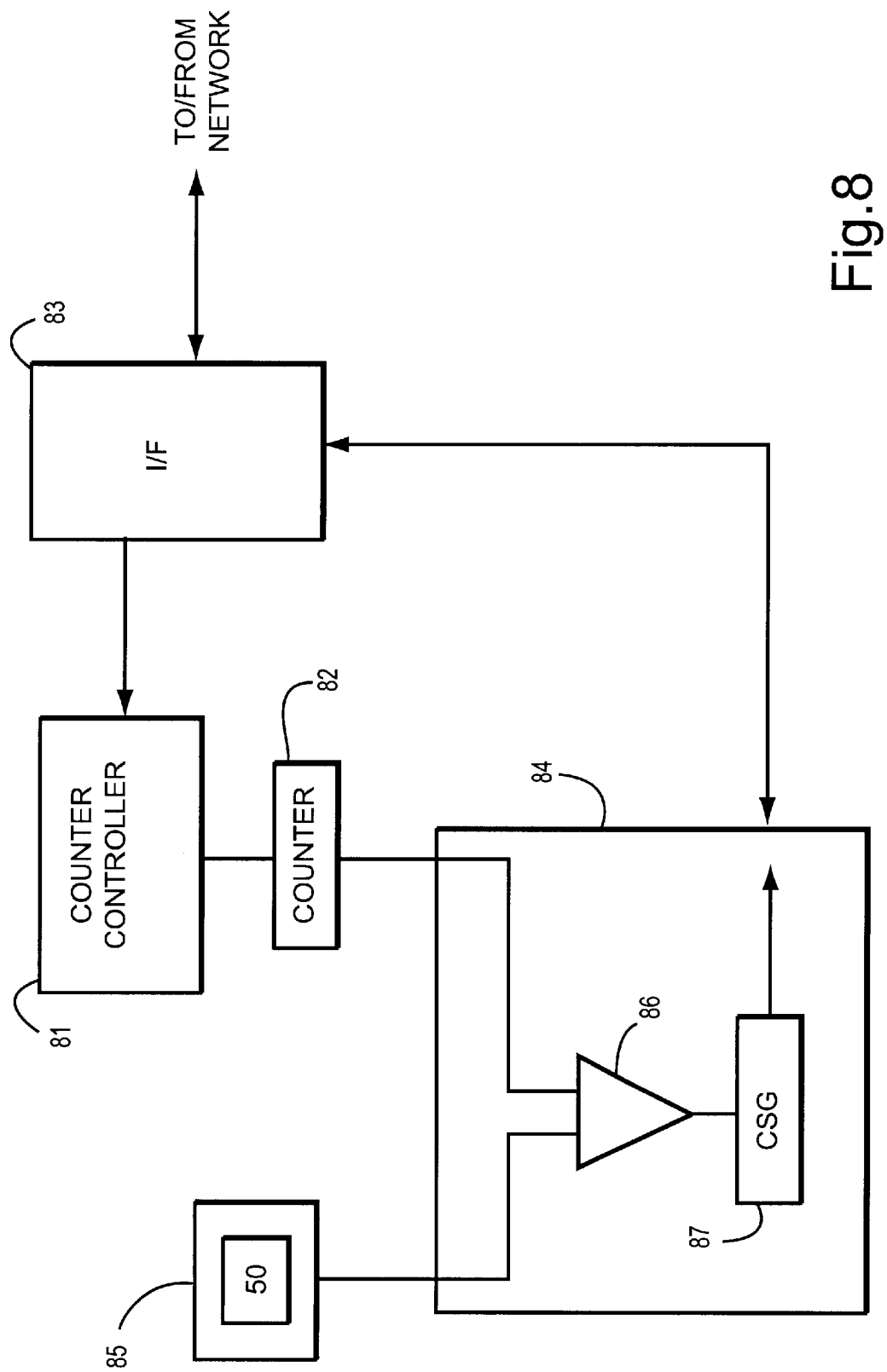
FIG. 8 is a diagram showing the principal functional components of an answering centre server.

FIG. 8 illustrates the principal functional components of the ACS. A counter controller 81 is connected to a counter 82 and to a network signalling interface 83. A call controller 84 includes a comparator 86 which compares the value of the counter 82, and a call capacity value which is recorded in store 85. The call controller uses a control signal generator 87 to return a control signal via the network interface depending on the results of the comparison. Although dedicated hardware may be used for some or all of these components, more usually the components are embodied by an appropriately programmed microprocessor and associated RAM (random access memory). An example of suitable software for implementing the ACS is contained in the Appendix below.

The OCS in this example is arranged to use a number of other resources, in addition to the ACS, to monitor and control traffic levels. In particular, it also uses Automatic Call Restriction (ACR) on the outbound traffic. As described in our above-cited international application, ACR limits the rate of calls admitted to the answering centre, to a value rather higher than the answering centre's answering rate capability. It does not need to know the answering centre's answering rate capability in order to do this: a teletraffic result states that for a call holding time of 10 s or greater, an excess of arrivals over mean answering capacity of 1.8 calls s$^-$ is sufficient to ensure 95% occupancy for any number of lines. The rate by which call arrivals exceed capacity is detected by setting triggers for Busy, No_Answer, and Route_Select_Failure events on calls admitted to the answering centre. (In practice triggers may also be set for Answer and Abandon to help with clean-up of call context information, though timeouts must always ensure old contexts are eventually removed). A monitor detects the rate of failure of calls admitted to the answering centre, and compares this rate with a target rate sufficient to ensure high occupancy (e.g. with 1.8 failures $s^{-1}$). An adjustable rate control element determines the rate of calls admitted to the answering centre. If the rate of failures deviates from the target rate, a negative feedback mechanism adjusts the admission rate control element. The admission rate control sets the admitted call rate at a level which maintains the rate of failed calls close to the target rate for failures.

The ACR monitor functions as a leaky bucket with a fixed leak rate equal to the target congestion event rate, incremented by each congestion event. The ACR control is another leaky bucket with a variable leak rate which is controlled by feedback from the monitor: increased if the monitor is emptying (insufficient traffic) and decreased if the monitor is filling (excessive traffic). The leak rate of the control bucket fixes the average rate at which calls are admitted to the answering centre. Calls are admitted to the answering centre if the control bucket is not full, and if a call is admitted the control bucket is incremented. If the call is not admitted the control bucket is not incremented.

ACR monitors are dynamically-allocated resources which are allocated when a congestion event is encountered at an answering centre. Thus triggers must be set on at least a sample of calls sent to all answering centres if ACR is to be activated on overload. The sampling fraction may be small, e.g. 1 call in 10, as the purpose is to detect an overload to enable allocation of a monitor. Once a monitor has been allocated, a larger fraction of calls are sampled (e.g., 1 call in 2 or 1 call in 3) to enable sufficiently fast response from the control feedback loop.

ACR controls are dynamically-allocated resources which are allocated and given an initial leak rate when an ACR monitor first crosses an onset threshold. The leak rate of an allocated control is then adapted under negative feedback control from the monitor. When the overload abates the control continues to adapt to higher leak rates until it reaches a maximum value at which it is de-allocated.

For multiple instances of ACR across the NIP, the target rate for excess of admitted traffic over answering centre capacity (e.g. 1.8 $s^{-1}$) is partitioned equally across instances.

In practice, ACR and ACS are found to be complementary in operation. When answering centres are receiving very high rates of ineffectives, then a significant reduction in the rate is achieved by ACR alone. When answering centres receive, for example, less than 1 ineffective every 10 seconds then ACR does not offer any reduction, while ACS offers a relatively small reduction. There is however a range which lies between these extremes where ACS offers a large reduction compared with the use of ACR on its own. Optionally, the OCS may monitor rates of ineffectives and invoke an ACS only when the rate lies in this optimum range.

When DACS (Dynamic ACS) and ACR are used together, then ACR is queried first. If ACR allows the call, then DACS is queried subsequently. Only if both ACR and DACS allow the call is it admitted. ACR uses less computing and communication resource than DACS, so the number of DACS instances may be restricted, while ensuring that ACR is always available. Then, if no DACS is available to be allocated, ACR remains in control.

The OCS is also designed for compatibility with Condition Based Routing (CBR). To ensure effective interworking of the OCS with a CBR node, the OCS/ACS is programmed, whenever it sets a notify detection point, to mimic the triggers expected by the CBR node in normal processing of a call. When an interrupt detection point is set, then instead of releasing the call, the OCS/ACS returns appropriate event reports to the CBR node, leaving open the possibility of further processing of the call by the CBR node, for example by diversion to a different number. The behaviour of the OCS/ACS therefore varies according to the nature of the detection points (DPs) set by the service:

1. Service sets no interrupt DPs, and ACS admits call. The SCP records all the DP's set by the service and arms in notify and continue (N&C) mode all DP's for call outcome. It passes to the service event reports for those DP's which were set by the service.

2. Service sets no interrupt DP's, and ACS rejects call. The SCP sends release call to the SSP. If the service set a BUSY DP, then a BUSY event report is returned to the service.

3. Service sets at least one interrupt DP, and ACS admits call. Record DP's set by the service. If any DP is not set in either mode, then set it in N&C mode. Pass to the service event reports for those DP's which were set by the service.

4. Service sets at least one interrupt DP, and ACS rejects call. Return event report for BUSY to the service. Do not send release call to the SSP.

Figure 4:
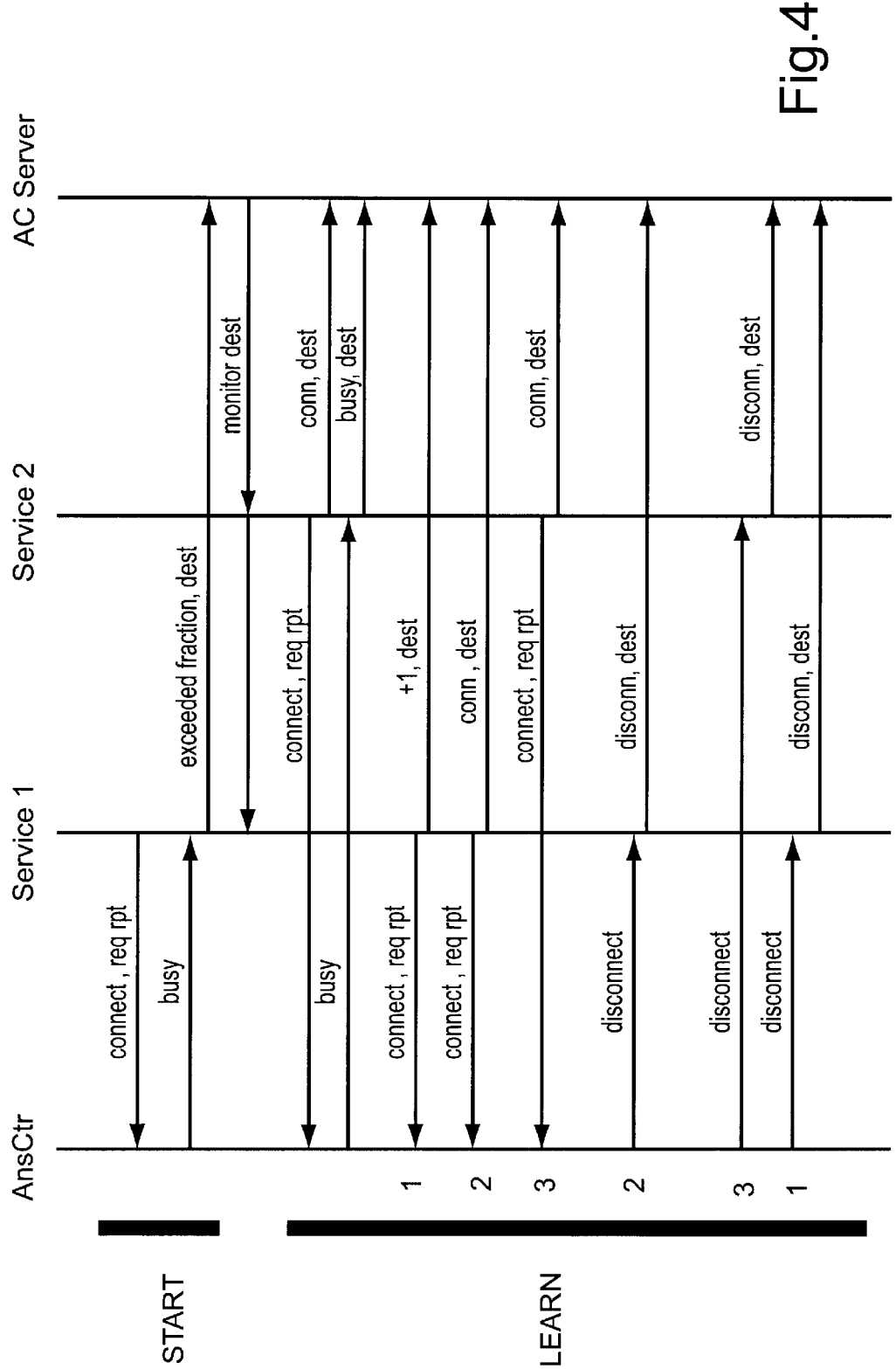
FIGS. 4 and 5 are call flow diagrams illustrating the operation of the network of FIG. 1.
Figure 5:
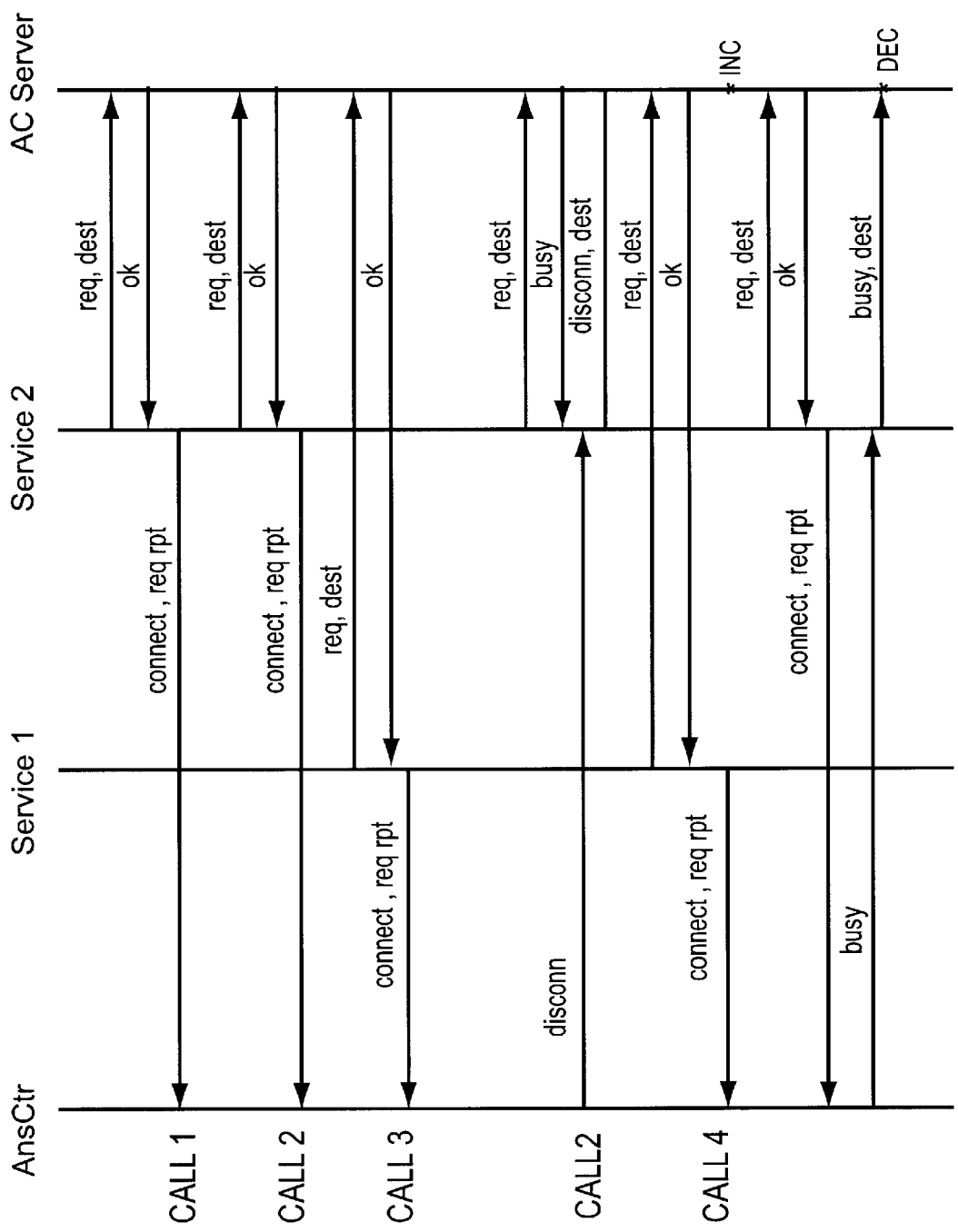

FIGS. 4 and 5 illustrate call flows in the system described above. FIG. 4 shows two instances (Service1 and Service2) of a single service for a single destination AnsCtr, and an instance "ACServer" of an answering centre server which is initially unallocated. Service1 and Service2 may be running on different computers. Both Service1 and Service2 sample the success of calls which they send to the destination by setting detection points for call failures (Busy, NoAnswer, RouteSelectFailure) on a small fraction (e.g. 1 in 10) of calls. At the top of the diagram, one such sampled call from Service 1 has encountered Busy. Service 1 informs its local OCS of the failure, and OCS allocates ACServer to the destination. ACServer informs all instances of the Service that it has been allocated to the destination, via the broadcast "monitor dest" message. In the Training phase, instances of the Service need not obtain explicit authorisation from the ACServer before they admit calls to the destination, and in this case the implementation exploits this fact to avoid making requests of the ACServer during the Training phase. The instances of Service send INAP Connect messages to the originating SSP, together with INAP Request Report messages to set detection points for call outcome. Then Service instances report to the ACServer that the call has started. Three calls labelled 1, 2, and 3 are shown. When the conversation phase of these calls ends, the originating SSP sends an event report for the Disconnect to the Service, which relays it to the ACServer. During this phase the ACServer builds a call record for each admitted call, in which it stores the start time for the call. Call records are removed if the call fails without a conversation phase, but if a call is answered its record is retained until the Disconnect is received. At this point the holding time is added to a sum of holding times for completed calls, and the count of the number of completed calls is incremented. Thus the ACServer can obtain the total holding time for those calls which started after it was allocated to the destination, and have now ended. By summation over the call records held for calls in progress it can find the number, and total duration so far, of calls currently holding, as required for training.

FIG. 5 shows operation of the DACS in its Tracking mode. Three calls labelled 1, 2, and 3 originate, and in each case the instance of the Service which processes those calls makes a request of the ACServer to determine whether it should admit the call. In each case the call is admitted, but call 3 causes the current calls-in-progress to reach the current maximum-calls-in-progress. The tracking timer is started and the ACServer enters the AwaitTimeout state. In this state a further originating call is processed by service instance Service 2, which makes a request to ACServer. As current calls-in-progress is equal to current maximum-calls-in-progress, the request is rejected ("busy" message from ACServer to Service2). The next event is call 2 disconnecting, reducing calls-in-progress by 1 and allowing the subsequent admission of call 4. Following this, the tracking timer expires, causing ACServer to increment maximum-calls-in-progress. The following request from Service2 to initiate a call 5 is therefore granted, but in fact the original (pre-increment) estimate of AnsCtr's capacity was correct, hence call 5 returns a "busy" event report from the SSP. In response to this, ACServer decrements maximum-calls-in-progress back to its correct value.

The appendix below lists C source code for a prototype implementation of the ACS. The source code is part of a program which performs an event-based simulation of the operation of a number translation service. The service is implemented using an Intelligent Network. The C source code included here contains those components of the simulation program which are responsible for simulating operation of the service; of ACR based control of traffic to destinations; and of DACS (Dynamic ACS) based control of traffic to destinations. The code shown here also models the destinations themselves. Program components external to this fragment are responsible for managing the time-ordered event list of the event driven simulation; for modelling call arrivals; for reading the input data files containing parameters which control the simulation; and for printing and displaying simulation results.

Individual calls are identified by a data item, callled, which is allocated by the function service( ) (see below). The callld can be viewed as modeling the TCAP transaction identifier in a real IN implementation.

At several points in the code, a line similar to:

fprintf(stderr,"PANIC . . . ")

occurs. These lines are executed where the program has detected an internal data inconsistency, and are present only as defensive programming. They are not executed in normal operation of the prototype.

The following description treats the C functions in the order they appear in the program fragment.

The first two functions, freeSvcCallRecord( ) and removeACRecord( ) are housekeeping functions. They are responsible for removal of the call records which are maintained by the functions which model services and destinations.

The function answeringCentre( ) within this code models the destinations themselves in terms of the number of lines to the destination, the number of agents (people) available to answer calls at the destination, call holding times, and the events in the progress of an individual call, as follows: calls admitted to a destination encounter busy if all lines are currently occupied. Otherwise, if an agent is available the call is answered immediately, and a CALL_COMPLETES event is created to model call disconnection. The CALL_COMPLETES event occurs after a call holding time which is negative-exponentially distributed with mean value given by a parameter of the service. If no agent is available the call may ring for a period set by RTNR_TIME. If an agent becomes available before the end of RTNR_TIME the call is answered, otherwise the call fails. When an event occurs during the progress of a call, the destination examines the flags component of the service data, to determine whether that event should be reported to the service. This action models the INAP message Request Report BCSM Event which would be sent to the source SSP in a real implementation. When one of the specified events occurs, the destination model creates a report of the state change which is loaded to the simulation's event list, for transmission to the service logic after a simulated delay. This delay simulates the signalling network and processing delays characteristic of a real IN. The function answeringCentre( ) is called when a specified event occurs. The event may be one of TS_COMPLETES, an attempt to initiate a new call; or CALL_COMPLETES, which occurs at the end of the conversation phase of a successful call; or RTNR_EVENT, which occurs when a call fails because no agent has become available to answer it within the specified time limit. The answeringCentre( ) maintains a count of callsBusy, i.e. those calls which are in an active conversation phase and occupying both a line and an agent; and a count of calls, i.e. those calls which are either in an active conversation phase or in a Ringing state. The difference, calls-callsBusy, is the number of calls which are in a Ringing state, and occupying a line but not an agent. These counts are manipulated appropriately whenever a call is initiated or a call changes its state due to an event.

On receiving the event TS_COMPLETES, which attempts to initiate a new call, answeringCentre( ) first checks if all lines are busy. If so it checks if the service has requested an event report for the busy condition, and if so it sends the report. If all lines are busy, then answeringCentre( ) does not create its own call record for the call. If a line is available, then answeringCentre( ) first creates its own record for the call, then checks to see if an agent is available. If so it answers the call immediately and informs the service if an event report for Answer has been requested. It sets up a simulation event for completion of the call. Otherwise it simulates a ringing call by setting a simulation timer for ring timeout.

On receiving the event RTNR_EVENT, answeringCentre( ) finds its record for the call. The simulation does not explicitly remove RTNR_EVENT from its time-ordered event list in those cases where call progress makes the event irrelevant, so RTNR_EVENT will always be received for any call which was not answered immediately, even if the call was subsequently answered and (possibly) later disconnected. Thus if no record is found for the call, or the record which is found shows the call to be in state Answered, the RTNR_EVENT is ignored. Otherwise, if the record is found and the call state is still Ringing, answeringCentre( ) checks whether the service has requested an event report for ring timeout, and if so, it sends a report. It then removes its own call record for the failed call.

On receiving the event CALL_COMPLETES, answeringcentre( ) first checks whether the service has requested an event report for call disconnection. If so it sends the report. It removes its own call record for the completed call. It then checks for any calls which are in the Ringing state. If there are any such calls, it answers the oldest, setting up an event for completion of this new call. If a report for the Answer event has been requested, it informs the service.

The function obControl( ) models the adaptation of the control component of the ACR scheme for control of destination overload. It receives onset (E_ONSET) and abatement (E_ABATE) events from an associated monitor, and timer (E_TB) events. Onset events indicate that the monitor has detected a new or renewed surge of Busy or other failure events at its associated destination, and lead to adaptation of the control to decrease the rate at which traffic is admitted to the destination. Abatement events indicate that a previously-reported surge of failure events has dropped to a rate below the monitor's characteristic rate, and lead to adaptation of the control to increase the rate at which traffic is admitted to the destination. Valid timer events indicate the persistence of a condition whose start was previously reported as an onset or abatement event. Valid timer events cause further adaptation of the control in the appropriate direction. Timer events are created whenever onset or abatement events occur, and whenever a valid timer event is processed. In this implementation, timer events are not removed when they become irrelevant (e.g. a timer event which is set following an onset event should be ignored if it matures after a subsequent abatement event). To ensure that irrelevant timer events are ignored, this implementation gives each timer event an identifier. The only valid timer event (for a given instance of a control) is the newest timer event (corresponding to the most recently allocated identifier).

The first onset event causes allocation and initialisation of the control. Eventually an abatement or timer event which causes the control rate to adapt above a configured maximum rate will cause deallocation of the control.

The functions dripMonCon( ) and allocateMonCon( ) together model the monitor component of the ACR scheme. If a Busy event is seen by the service for a destination, the service( function (see below) checks for an allocated monitor. If it finds an allocated monitor it calls dripMonCon( ) to increment the monitor. dripMonCon( ) may pass an E_ONSET event to obControl( ). However if the service finds no allocated monitor for the destination it calls allocateMonConO which attempts to allocate and initialise the monitor.

Periodic leaking of monitor leaky buckets is carried out when "LEAK" events mature on the simulation's main time-ordered event list, and hence is not shown in this code fragment. Only the creation of the initial "LEAK" event for each monitor instance is within this code, in allocateMonCono( ).

The function OBCadmitCall( ) models the use of the control in determining whether to admit a call to a destination. If no control is allocated the call is admitted, whether or not a monitor is allocated. If a control is allocated, the level of the control's leaky bucket is first decreased using the control's current leak rate, then the level is tested to see if the call may be admitted. If it is, the bucket level is incremented. The function's return value indicates whether the call is admitted.

The main tasks of function ACSadmitCall( ) is to determine whether a specific call should be admitted by the DACS, and to control the adaptation of the limit on maximum calls in progress. Calls are admitted either if the DACS is in Training mode, or if the DACS is in Tracking mode and the number of calls in progress is less than the current limit on maximum calls in progress. If a call is admitted, the DACS creates a call record which initially describes the state of the call as Ringing. If the DACS is in Tracking mode, ACSadmitCall( ) checks whether the admission of this call brings the calls in progress up to the current limit on maximum calls in progress. If so, and the current state is Idle, it sets the track and deallocation timers. If the DACS is in Tracking mode and in the state AwaitingTimeout, ACSadmitCall( ) checks whether the track timer has matured. If so, it increments the maximum calls in progress limit and sets the state to Idle. A further task carried out by ACSadmitCall( ): to check whether the deallocation timer has matured, and if so to deallocate the DACS instance from the destination, freeing the memory used by the DACS' current call records.

The function ACSallocate( ) is called by the function service( ) (see below) when a busy event is detected for a destination. If an instance of DACS is available to be allocated to the destination, it is allocated and initialised, and ACSallocate returns the identity of the DACS instance to service( ).

The function ACSanswer( ) is invoked when an answer event is received for a call to a destination for which a DACS is allocated. It maintains a running maximum of those calls which are in the conversation phase, so if the successful answering of this call results in a current number of simultaneously active conversations which is greater than the previous maximum simultaneous conversations, the running maximum is set equal to the number of currently-active conversations. If the DACS is in Training mode, a test is made to see if the conditions for completing Training have been achieved. If so, the DACS enters Tracking mode with its maxCallsInProgress set equal to the estimate derived from the Training mode. The DACS then finds its call record for the answered call, and sets its state equal to Answered.

The function ACSterminate( ) is invoked when a termination event is received for a call to a destination for which a DACS is allocated. The termination reason may be Busy, RTNR (i.e. NoAnswer), or disconnection (a real DACS would also deal with abandoned calls but these are not simulated here). ACSterminate( ) finds the call record for this call. If the termination reason is Busy, the calls-in-progress counter is decremented. If the DACS is in Tracking state, the current limit on maximum calls in progress is decremented, and the adaptation increment reset to 1. If the termination reason is RTNR, the calls-in-progress counter is decremented. If the termination reason is disconnection, the counters for current calls in progress and current conversations are both decremented, and the running sum of holding times for completed calls is updated (for use in training).

The function service( ) simulates service logic. The tasks simulated are: call initiation, requests to OBCadmitCall( ) and ACSadmitCall( ) for permission to admit calls, and the processing of subsequent event reports for admitted calls. It is called with an event parameter: either TS_COMPLETES, AC_ANSWER, AC_RTNR, AC_COMPLETES, AC_BUSY, or AC_ABANDON, indicating respectively a new call, an event report for call answered, an event report for call not answered (ring tone no reply), an event report for call disconnection after a conversation phase, an event report for destination busy, and an event report for call abandoned (which is not implemented in this simple simulation). All of these calls to service( ) are made as a result of events on the simulation's time-ordered event list, as they occur after a delay following the occurrence of a previous event. TS_COMPLETES occurs after a delay simulating processing in preceding NIP functions. AC_ANSWER, AC-RTNR, AC_COMPLETES, AC_BUSY, and AC_ABANDON all occur as a result of events at the destination, but become known to the service only after a delay (simulating transmission across a signalling network).

On event TS_COMPLETES, service( ) first allocates a callId for the call, then looks for a service corresponding to the dialled number. The program permits simulation of background traffic for which no service is defined, so a service is not necessarily found for every call. If a service is found, service( ) requests permission to admit the call, first from OBCadmitCall( ), then (if a DACS is allocated to the destination) from ACSadmitCall( ). If the call is admitted, and event reports will be generated, a call record is created and initialised to allow tracking of the state of the call. Finally the answering centre data is found for the (translated) destination number, and the call sent to the destination by invoking answeringCentre( ). Counters are maintained to allow reporting of simulation results, e.g. serviceArray[i].acreje counts calls rejected by DACS, serviceArray[i].reje counts calls rejected by ACR.

This shows integration of ACR and DACS by querying ACR (implemented by OBCadmitCall( )) first, then querying DACS (implemented by ACSadmitCall( )) second. If ACR does not allow the call, the call terminates immediately. However, if ACR allows the call, a subsequent query is made to DACS. The call is admitted only if both control schemes allow it. This allows ACR to limit any rapidly-rising transient of traffic to the destination whilst the DACS is in Training mode. As soon as the DACS enters Tracking mode, the number of congestion events (Busy or RTNR) detected at the destination will quickly drop below the ACR's monitor rate. As a result, the ACR's control will adapt up to an admission rate at which it does not restrict traffic, and will eventually deallocate, leaving the DACS in control of call admission.

Control by ACR of the calls admitted to DACS does not affect the DACS training schemes described above, which depend only on call holding times.

On event AC_ANSWER, service( ) finds the appropriate service data for the destination number, and increments the reporting counter for answered calls. If a DACS is allocated, it is called to process the Answer event (see above).

On event AC_RTNR, service( ) finds service data for the destination number, and increments the reporting counter for calls meeting ring-tone-no-reply. As this is a call termination event it removes its own record for the call. As this is a call failure event, it invokes ACR functions, either to increment an existing monitor for the destination or to allocate a monitor for the destination (see above). If a DACS instance is allocated, it invokes ACSterminate( ) for the RTNR event (see above).

On event AC_COMPLETES, service( ) finds service data for the destination number. As this is a call termination event it removes its own record for the call. If a DACS instance is allocated, it invokes ACSterminate( ) for the disconnection event (see above).

On event AC_BUSY, service( ) finds service data for the destination number, and increments the reporting counter for calls meeting busy. As this is a call termination event it removes its own record for the call. As this is a call failure event, it invokes ACR functions, either to increment an existing monitor for the destination or to allocate a monitor for the destination (see above). If a DACS instance is allocated, it invokes ACSterminate( ) for the Busy event (see above).

APPENDIX - ACS C SOURCE CODE LISTING

```
#include <stdio.h>
#include <stdlib.h>
#include <malloc.h>
#include <math.h>
#include "EXTERNS.H"
#include "EVENTLST.H"
#include "RANDOMS.H"
void freeSvcCallRecord( int svcId, long callId)
{
  struct callRecord (int svcId, long callId)
  if ((serviceArray [svcId].ptr) —>callId == callId)
  {
    last RecPtr = serviceArray[svcId].ptr;
    serviceArray[svcId].ptr = lastRecPtr—>ptr;
    free (lastRecPtr) ;
  }
  else
  {
    lastRecPtr = serviceArray[svcId].ptr;
    recPtr = lastRecPtr—>ptr;
    while ((recPtr != 0) && (recPtr—>callId != callId))
        {lastRecPtr = recPtr; recPtr = recPtr—>ptr;}
    if (recPtr == 0)
        {fprintf(stderr,
                "PANIC: no call rec svc %d call %1d
freeCallRecord\n",svcId,callId);
        exit (1) ;}
  +else
    {
    lastRecPtr—>ptr = recPtr—>ptr;
    free(recPtr);
    }
  }
}
void removeACRecord(int acId, long callId)
{
  struct callRecord *ptr, *lastPtr;
  if ((ACaaray[acId].ptr) —>callId == callId)
```

-continued

APPENDIX - ACS C SOURCE CODE LISTING

```c
    { /* element to be removed is first element of list */
    ptr = ACarray[acId].ptr;
    ACarray[acId].ptr = ptr—>ptr;
    free(ptr);
    }
  else
    { /* remove a general list element */
    lastPtr = ACarray[acId].ptr; ptr = lastPtr—>ptr;
    while ((ptr != 0) && (ptr—>callId != callId))
      {lastPtr = ptr;ptr = ptr—>ptr;}
      if (ptr == 0)
          fprintf (stderr, "removeACRecord( ) asked to remove nonexistent
record\n");
      else
        {
        lastPtr—>ptr = ptr—>ptr;
        free (ptr);
        }
      }
    }
}
void answeringCentre (int acId, int event, int flags, int svcId,
                     long callId, double time)
{
/* TS_COMPLETES, CALL_ANSWERED, CALL_COMPLETES, RTNR_EVENT */
double t;
int p;
struct callRecord *callRecPtr, *lastRingRecPtr;
switch (event)
  {
  case TS_COMPLETES:
    {
    if (ACarray[acId].calls == ACarray[acId].lines)
      {/* if appropriate flag set, send AC_BUSY back to service */
      if (flags & Busy)
        {
        p = AC_BUSY; t = time + SND_DELAY_TIME;
        addEventToList (t, p, ACarray[acId].destn, callId, 0);
        }
      else;/* don't respond */
      }
    else
      {
      /* arriving call is either answered or starts ringing */
      /* create call record */
          callRecPtr = (struct callRecord *) malloc(sizeof(struct
calLRecord));
      /* link it in at head of list */
      callRecPtr—>ptr = ACarray[acId].ptr;
      ACarray[acId].ptr = callRecPtr;
      /* and populate it */
      callRecPtr—>flags = flags;
      callRecPtr—>callId = callId;
      callRecPtr—>dialled = 0;
      callRecPtr—>destn = 0;
      callRecPtr—>svcId = svcId;
      /* increment calls counter */
      ACarray[acId].calls++;
      /* If an agent is available, answer the call. Otherwise, set up an
      RTNR event for the call.
      Pending, ringing calls will then be answered immediately an agent
      becomes available */
      if (ACarray[acId].callsBusy < ACarray[acId].agents)
          { /* answer call */
          callRecPtr—>state = Answered;
          ACarray[acId].callsBusy++;
          /* if flags are set, tell service that call has been answered */
          if (flags & Answer)
            {
            p = AC_ANSWER; t = time + SND_DELAY_TIME;
            addEventToList (t, p, ACarray[acId].destn, callId, 0);
            }
          else;/* don't respond */
          /* set up call completion event */
          p = CALL_3COMPLETES;
          t = time + expon(serviceArray[callRecPtr—>svcId].holdTime);
          addEventToList (t, p, acId, callId, 0);
          }
```

-continued

APPENDIX - ACS C SOURCE CODE LISTING

```c
        else
        {
        /* call rings */
        callRecPtr—>state = Ringing;
        /* set up RTNR event */
        p = RTNR_EVENT; t = time + RTNR_TIME;
        addEventToList (t, p, acId, callId, 0);
        }
        }
      break;
      }
    case RTNR_EVENT:
      {
      /* this may occur after completion events which have changed
         the state to answered or removed the corresponding call record
         completely - if call record is not found, or call has been
         answered, ignore the event */
      callRecPtr = ACarray[acId].ptr;
      while ((callRecPtr != 0) && (callRecPtr—>callId != callId))
        callRecPtr = callRecPtr—>ptr;
      if ((callRecPtr =callRecPtr—>ptr;
      if ((callRecPtr != 0) && (callRecPtr—>state == Ringing))
        {
        /* if flags are set, tell service that call has caused RTNR */
        if (callRecPtr—>flags & Rtnr)
          {
          p = AC_RTNR; t = time + SND_DELAY_TIME;
          addEventToList(t, p, ACArray[acId].destn, callId, 0);
          }
        else;/* don't respond */
        /* remove call record & adjust counters */
        removeACRecord(acId,callId);
        ACarray[acId].calls--;
        /* no effect on callsBusy because this call was never answered */
        }
      else; /* there was no call record, or it's no longer Ringing */
      break;
      }
    case CALL_COMPLETES:
      {
      /* find call record */
      callRecPtr = ACarray[acId].ptr;
      while ((callRecPtr != 0) && (callRecPtr—>callId != callId))
        callRecPtr = callRecPtr—>ptr;
      if (callRecPtr != 0)
        {
        if (callRecPtr—>flags & Disconnect)
          {
          p = AC_COMPLETES; t = time + SND_DELAY_TIME;
          addEventToList (t, p, ACarray[acId].destn, callId, 0);
          }
        else;/* don't respond */
        }
      else
        {
        fprintf(stderr, "PANIC: CALL_COMPETES event could not find call
record\n");
        exit(1);
        }
      removeACRecord(acId,callId);
      ACarray[acId].callsBusy--;
      ACarray[acId].calls--;
      /* try to use this agent to pick up any ringing call */
      if (ACarray[acId].callsBusy < ACarray[acId].calls)
        { /* some calls are in the ringing state - find oldest */
        callRecPtr = ACarray[acId].ptr;
        lastRingRecPtr = 0;
        while (callRecPtr != 0)
          {
          if (callRecPtr—>statre == Ringing)
            lastRingRecPtr = callRecPtr;
          else;
          callRecPtr = callRecPtr—>ptr;
          }
        if (lastRingRecPtr != 0)
          {
          lastRingRecPtr—>state = Answered;
```

APPENDIX - ACS C SOURCE CODE LISTING

```
      ACarray[acId].callsBusy++;
      /* & set up completion event for this call */
      p = CALL_COMPLETES;
      t = time + expon (serviceArray[lastRingRecPtr—>svcId].holdTime);
      addEventToList(t, p, acId, lastRingRecPtr—>callId, 0);
      /* if flags are set, tell service that call has been answered */
      if (lastRingRecPtr—>flags & Answer)
        {
        p = AC_ANSWER; t = time + SND_DELAY_TIME;
          addEventToList (t, p, ACarray[acId].destn, lastRingRecPtr—
>callId, 0);
        }
      else;/* don't respond */
      }
      else /* lastRingRecPtr == 0 */
      {
      fprintf(stderr, "PANIC: callsBusy<calls but no record Ringing\n");
      exit(1);
      }
      }
      else; /* no pending ringing calls */
      break;
      }
    }
  }
}
void obControl (int cId, int event, double time, int timerID)
 { /* state machine for outbound control */
 double t;
 int p;
 switch(event)
   {
   case E_ONSET:
      switch (obcMonCon[cId].conState)
        {
        case INCREASING:
        if (obcMOnCon[cId].monState == ASSIGNED_UNCONTROLLED)
          {
          obcMonCon[cId].monState = ASSIGNED_CONTROLLED;
          obcMonCon[cId].Crate =
             monConTypeArray[obcMonCon[cId].monConType].CinitialRate;
          obcMonCon[cId].Clevel = 0.0;
          obcMonCon[cId].timeConLastLeaked = time;
          obcMonCon[cId].lastPlottedRate =
                monConTypeArray[obcMonCon[cId].monConType].CinitialRate;
          obcMonCon[cId].lastPlotState = ASSIGNED_UNCONTROLLED;
          }
          else
          obcMonCon[cId].Crate /=
             monConTypeArray[obcMonCon[cId].monConType].CrateMult;
            obcMonCon[cId].conState = DECREASING;
                 t = time +
monConTypeArray[obcMonCon[cId].monConType].monConType].CadaptTimer;
         p = OBC_TB_EXPIRES;
              obcMonCon[cId].timerID = (obcMonCon[cId].timerID + 1) %
MAX_IN_S_BITS;
         addEventToList (t, p, cId, 0, obcMonCon[cId].timerID);
         break;
          case DECREASING:
         /* ignore */
         break;
          default:
         {fprintf(stderr, "PANIC: unexpected state %d in obControl\n",
             obcMonCon[cId].conState);
         exit(1); }
         }
       break;
       case E_ABATE:
         switch(obcMonCon[cId].conState)
         {
         case INCREASING:
          /* ignore */
         break;
         case DECREASING:
           obcMonCon[cId].conState = INCREASING;
                         obcMonCon[cId].Crate *=
monConTypeArray[obcMonCon[cId].monConType].CrateMult;
                obcMonCon[cId].timerID = (obcMonCon[cId].timerID + 1) %
```

-continued

APPENDIX - ACS C SOURCE CODE LISTING

```
MAX_IN_5_BITS;
    if (obcMonCon[cId].Crate >
            monConTypeArray[obcMonCon[cId].monConType].CmaxRate)
        {
        obcMonCon[cId].monState = ASSIGNED_UNCONTROLLED;
        }
        else
        {
                        t = time +
monConTypeArray[obcMonCon[cId].monConType].CadaptTimer;
    p = OBC_TB_EXPIRES;
    addEventToList (t, p, cId, 0, obcMonCon[cId].timerID);
        }
        break;
        default:
        {fprintf(stderr"PANIC: unexpected state %d in obControl\n",
            obcMonCon[cId].conState);
        exit(1); }
        }
    break;
  case E_TB:
    if (timerID == obcMonCon[cId].timerID)
    {
    switch(obcMonCon[cId].conState)
        {
        case INCREASING:
          obcMonCon[cId].Crate *=
        monConTypeArray[obcMonCon[cId].monConType].CrateMult;
          obcMonCon[cId].timerID = (obcMonCon[cId].timerID + 1) %
MAX_IN_5_BITS;
    if (obcMonCon[cId].Crate >
            monConTypeArray[obcMonCon[cId].monConType].CmaxRate)
        {
        obcMonCon[cId].monState = ASSIGNED_UNCONTROLLED;
        }
        else
        {
        t = time +
monConTypeArray[obcMonCon[cId].monConType].CadaptTimer;
    p = OBC_TB_EXPIRES;
    addEventToList(t, p, cId, 0, obcMonCon[cId].timerID);
        }
        break;
        case DECREASING:
          obcMonCon[cId].Crate /=
        monConTypeArray[obcMonCon[cId].monConType].CrateMult;
          break;
        default:
        {fprintf(stderr, "PANIC: unexpected state %d in obControl\n",
            obcMonCon[cId].conState);
        exit(1);}
        } /* end switch */
                        t = time +
monConTypeArray[obcMonCon[cId].monConType].CadaptTimer;
        p = OBC_TB_EXPIRES;
            obcMonCon[cId].timerID = (obcMonCon[cId].timerID + 1) %
MAX_IN_5_BITS;
        addEventToList(t, p, cId, 0, obcMonCon[cId].timerID);
        }
        else; /* ignore out-of-date timer */
        break;
    default:
        {fprintf(stderr, "PANIC: unexpected event %d in obControl\n",event);
    exit(1); }
    }
}
}
void dripMonCon(int monConId, double time)
{
 double level;
 int monConType;
 monConType = obcMonCon[monConId].monConType;
 level = obcMonCon[monConId].Mlevel + 1.0;
 if (level > monConTypeArray[monConType].Mmaximum)
  level = monConTypeArray[monConType].Mmaximum;
 else if (level == monConTypreArray[monConType].Monset)
  obControl(monConId,E_ONSET,time,0);
 else;
```

APPENDIX - ACS C SOURCE CODE LISTING

```c
  obcMonCon[monConId].Mlevel = level;
/* printf("drip to obc mon %d level = %lg\n",monConId,level);*/
  }
int allocateMonCon(int svcId, double time)
  {
  int index;double t;
  int p;
  /* look for a free MonCon */
  index = 0;
  while ((inded < NUMMONCONS) && (obcMonCon[index].svcId != -1))
    index++;
  if (index '= NUMMONCONS)
    {
    obcMonCon[index].svcId = svcId;
    obcMonCon[index].conState = DECREASING;
    obcMonCon[index].monState = ASSIGNED   obcMonCon[index].UNCONTROLLED;
    obcMonCon[index].monConType = serviceArray[svcId].monConType;
    obcMonCon[index].timeConLastLeaked = time;
    obcMonCon[index].Mlevel = 0.0;
    obcMonCon[index].Clevel = 0.0;
    obcMonCon[index].Crate =
            monConTypeArray[serviceArray[svcId].monConType].CinitialRate;
    obcMonCon[index].timerID = 0;
    obcMonCon[index].lastPlottedRate =
       monConTypeArray[obcMonCon[index].monConType].CinitialRate;
    obcMonCon[index].lastPlotState = ASSIGNED_UNCONTROLLED;
    t = time + 1.0/monConTypeArray[obcMonCon[index].monConType].Mrate;
    p = MONCON_LEAKS;
/* fprint(stderr,"setting leak time=%lg leak at %lg\n",time,t);*/
    addEventToList(t,p,index,0,0);
    return (index);
    }
  else
    return (-1); /* unable to allocate MonCon */
  }
int OBCadmitCall (int svcId, double time)
  {
  int monConId;
  double maxLevel;
  if ((monConId = serviceArray[svcId].monConIndex) == -1)
    return (1); /* no assigned monitor - admit call */
  else if (obcMonCon[monConId].monState == ASSIGNED_UNCONTROLLED)
    return (1); /* traffic monitored but not controlled */
  else /* traffic is monitroed and controlled */
    {
                          maxLevel =
monConTypeArray[serviceArray[svcId].monConType].CmaxLevelp;
    /* first leak */
    obcMonCon[monConId].Clevel -= obcMonCon[monConId].Crate*
         (time - obcMonCon[monConId].timeConLastLeaked);
    if (obcMonCon[monConId].Clevel < 0.0)
       obcMonCon[monConId].Clevel = 0.0;
    else;
    obcMonCon[monConId].timeConLastLeaked = time;
    /* is there room to squeeze another drip into bucket?? */
    if (obcMonCon[monConId].Clevel < (maxLevel-1.0))
       {
       obcMonCon[monConId].Clevel += 1.0;
       return (1);
       }
     else
       return (0);
    }
  }
int ACSadmitCall (int acId, long callId, double time)
    {
    struct ACSRecord *ptr;
    if ((ACSArray[acId].state == Tracking) &&
        (time > ACSArray[acId].deallocTime))
        {
        serviceArray[ACSArray[acId].svcId].ACSindex = -1;
        while (ACSArray[acId].ptr != (struct ACSRecord *)0)
          {
          ptr = ACSArray[acId].ptr;
          ACSArray[acId].ptr = ptr—>ptr;
          free(ptr);
          }
```

-continued

APPENDIX - ACS C SOURCE CODE LISTING

```c
    ACSArray[acId].svcId = -1;
    return (1);
    }
  else if ((ACSArray[acId].callsInProgress <
           ACSArray[acId].maxCallsInProgress) ||
        (ACSArray[acId].state == Training))
    {
    ACSArray[acId].callsInProgress+=;
    /* add call record at front of list */
    ptr = ACSArray[acId].ptr;
    ACSArray[acId].ptr = malloc (sizeof(struct ACSRecord));
    (ACSArray[acId].ptr) —>ptr = ptr;
    (ACSArray[acId].ptr) —>callId = callId;
    (ACSArray[acId].ptr) —>time = time;
    (ACSArray[acId].ptr) —>state = Ringing;
    /* adaptation stuff */
    if ((ACSArray[acId].state == Tracking) &&
         (ACSArray[acId].substate == Idle))
      {
                      if (ACSArray[acId].callsInProgress ==
ACSArray[acId].maxCallsInProgress)
         {
         ACSArray[acId].substate = AwaitingTimeout;
         ACSArray[acId].nextIncTime = time + ACS_INC_TIME;
         ACSArray[acId].deallocTime = time + ACS_DEALLOC_TIME;
         }
       else; /* not pushing any envelopes this time hem hem */
       }
    else if (ACSArray[acId].substate == AwaitingTimeout)
       {
       if (time >= ACSArray[acId].nextIncTime)
         {
         ACSAray[acId].maxCallsInProgress += ACSArray[acId].increment;
         ACSAray[acId].increment += ACS_INC_INC;
         ACSAray[acId].substate = Idle;
         }
       else; /* not time to increment yet */
       }
     else; /* must be in training mode */
     return (1);
     }
  else /* no space */
     return (0);
  }
int ASCallocate(int svcId, double time)
  {
  int i;
  i=0;
  while ((i<NUMACSVRS) && (ACSArray[i].svcId != -1))
    i++;
  if (i==NUMACSVRS)
    return(-1);
  else
    {
    ACSArray[i].svcId = svcId;
    ACSArray[i].state = Training;
    ACSArray[i].maxConversations = 0;
    ACSArray[i].currentConversations = 0;
    ACSArray[i].totalAnswered = 0;
    ACSArray[i].allocTime = time;
    ACSArray[i].numCompletedCalls = 0;
    ACSArray[i].totalTimeCompletedCalls = 0.0;
    ACSArray[i].maxCallsInProgress = 0;
    ACSArray[i].callsInProgress = 0;
    ACSArray[i].increment = 1;
    ACSArray[i].ptr = (struct ACSRecord *)0;
    return (i);
    }
  }
void ACSanswer(int acId, long callId, double time)
  {
  struct ACSRecord *ptr;
  double totalTimeIncompelteCalls, estimatedHoldTime;
  ACSArray[acId].currentConversations++;
  ACSArray[acId].totalAnswered++;
               if (ACSArray[acId].currentConversations >
ACSArray[acId].maxConversations)
```

APPENDIX - ACS C SOURCE CODE LISTING

```
                    ACSArray[acId].maxConversations =
ACSArray[acId].currentConversations;
 else;
 if ((ACSArray[acId].state==Training) &&
        (ACSArray[acId].totalAnswered >= 20) &&
                       (ACSArray[acId].numCompletedCalls >
ACSArray[acId].totalAnswered/2))
    {
    ACSArray[acId].state = Tracking;
    ACSArray[acId].substate = Idle;
    ACSArray[acId].increment = 1;
    totalTimeIncompleteCalls = 0.0;
    ACSArray[acId].deallocTime = time + ACS_DEALLOC_TIME;
    ptr = ACSArray[acId].ptr;
    while (ptr != (struct ACSRecord *)0)
       {
       if (ptr—>state == Answered)
       totalTimeIncompleteCalls += time - ptr—>time;
       else; /* don't add times for Ringing! */
       ptr = ptr—>ptr;
       }
      estimatedHoldTime = (totalTimeIncompleteCalls +
                  ACSArray[acId].totalTimeCompeltedCalls)/
                  ACSArray[acId].numCompletedCalls;
                    ACSArray[acId].maxCallsInProgress =
(int) ((double)ACSArray[acId].maxConversations/
                    (1.0 - exp((ACSArray[acId].allocTime -
time)/estimatedHoldTime)));
      fprintf(stdout,
       "entered tracking maxConv = %d lines est = %d estholdtime = %lg\n",
       ACSArray[acId].maxConversations,ACSArray[acId].maxCallsInProgress,
       estimatedHoldTime) ;
      }
   else;
   ptr = ACSArray[acId].ptr;
   while ((ptr '= (struct ACSRecord *)0) && (ptr—>callId != callId))
    ptr = ptr—>ptr;
   if (ptr == (struct ACSRecord *)0)
    /* do nothing */
   else
    {
    ptr—>state = Answered;
    ptr—>time = time;
    }
   }
void ACSterminate (int acId, long callId, int reason, double time)
   {
   /* find & remove record for busy/rtnr/completed calls
      decrement calls in progress
      for completed calls, increment number and time stats */
   struct ACSRecord *ptr, *lastPtr;
   /* first find record and relink list WITHOUT record,
tl,3 finish with ptr pointing to record to be analysed & removed
OR ptr == NULL if call record is not in list */
   if (ACSArray[acId].ptr == (struct ACSRecord *)0)
     ptr = ACSArray[acId].ptr;
   else if (ACSARRay[acId].ptr—>callId == callId)
     {
     ptr = ACSArray[acId].ptr;
     /* and relink removing head of list */
     ACSArray[acId].ptr = ptr—>ptr;
     }
   else
     {
     lastPtr = ACSArray[acId].ptr;
     ptr = ACSArray[acId].ptr—>ptr;
     while ((ptr != (struct ACSRecord *)0) && (ptr—>callId != callId))
       {
       lastPtr = ptr;
       ptr = ptr—>ptr;
       }
     if (ptr != (struct ACSRecord *)0)
       lastPtr—>ptr = ptr—>ptr;
     else;
     }
 /* assert pointer now pointing at head element OR ptr == NULL */
 if (ptr != (struct ACSRecord *)0)
```

-continued

APPENDIX - ACS C SOURCE CODE LISTING

```
    {
    switch (reason)
      {
      case AC_BUSY:
        ACSArray[acId].callsInProgress--;
        if (ACSArray[acId].state == Tracking)
          {
          /* adaptation stuff: any busy must decrement maxCallsInProgress
limit */
          ACSArray[acId].maxCallsInProgress--;
          ACSArray[acId].increment = 1;
          ACSArray[acId].substate = Idle;
          }
        else;
        break;
      case AC_RTNR:
        ACSArray[acId].callsInProgress--;
        break;
      case AC_COMPLETES:
        ACSArray[acId].callsInProgress--;
        ACSArray[acId].currentConversations--;
        ACSArray[acId].numCompletedCalls++;
        ACSArray[acId].totalTimeCompletedCalls += time - ptr—>time;
        break;
      default:
        fprintf(stderr,
        "PANIC: ACSterinate: invalid termination reason for acId %d callId
%ld\n",
          acId, callId);
        exit(1);
        break;
      }
    free (ptr);
    }
  else; /* call record was not found: do nothing */
  }
void service(int event, int dialled, long callId, double time)
  /* for some events, callId is passed in, for TS_COMPLETES it is
      generated internally */
  {
  static long nextCallId = 1;
  struct callRecord *callRecPtr;
  int i,j,k;
  switch (event)
    {
    case TS_COMPLETES:
      {
      callId = nextCallId;
      nextCallId++;
      i = 0;
      /* find service ID for this dialled number - there may be none */
      while ((i < NUMSVCS) && (serviceArray[i].dialled != dialled))
        i++;
      if (i < NUMSVCS)
        {
        if (OBCadmitCall (i,time))
          { /* if EITHER no AnsCenSvr allocated, or it admits the call . . .
*/
              if (((k=serviceArray[i].ACSindex) == -1) ||
(ACSadmitCall(k,callId,time)))
            {
            if (serviceArray[i].flags)
              {
              /* create call record */
              callRecPtr = (struct callRecord *) malloc(sizeof(struct
callRecord));
              /* link it in */
              callRecPtr—>ptr = serviceArray[i].ptr;
              serviceArray[i].ptr = callRecPtr;
              /* and populate it */
              callRecPtr—>flags = serviceArray[i].flags;
              callRecPtr—>dialled = dialled;
              callRecPtr—>destn = serviceArray[i].destn;
              callRecPtr—>callId = callId;
              }
            else; /* no flags set so no call record required */
            /* find answering centre ID for the destn number */
```

-continued

APPENDIX - ACS C SOURCE CODE LISTING

```
      j = 0;
                while ((j < NUMACS) && (ACarray[j].destn !=
serviceArray[i].destn))
      j++;
      if (j == NUMACS)
      {
          fprintf(stderr, "PANIC: no Answering Centre found for defined
service\n");
      exit(1);
      }
      else;
      /* and send call to answering centre */
      answeringCentre(j,TS_COMPLETES,serviceArray[i].flags,
               i,callId,time);
      }
      else /* don't admit call - ACS overflow */
        serviceArray[i].acreje++;
      }
      else /* don't admit call - OBC overflow */
        serviceArray[i].reje++;
      }
    else; /* no service for this dialled number */
    break;
    }
    case AC_ANSWER:
    {
    /* find service ID for this dialled number - there must be one */
    i = 0;
    while ((i < NUMSVCS) && (serviceArray[i].destn != dialled))
    i++;
    if (i < NUMSVCS)
    {
    serviceArray[i].answ++;
    if ((j=serviceArray[i].ACSindex) != -10
      ACSanswer(j,callId,time);
    else;
    }
   break;
   }
  case AC_RTNR:
   {
   /* find service ID for this dialled number - there must be one */
   i = 0;
   while ((i < NUMSVCS) && (serviceArray[i].destn != dialled))
      i++;
   if (i < NUMSVCS)
      {
      serviceArray[i].rtnr++;
      freeSvcCallRecord(i, callId);
      if ((j=serviceArray[i].monConIndex) != -1)
        dripMonCon(j,time);
      else
        serviceArray[i].monConIndex = allocateMonCon(i,time);
      if ((j=serviceArray[i].ACSindex) != -1)
        ACSterminate(j,callId,AC_RTNR,time);
      else
        serviceArray[i].ACSindex = ACSallocate(i,time);
      }
       else
          {fprintf(stderr, "PANIC: no service found for AC_RTNR
event\n");exit(1);}
      break;
      }
      case AC_COMPLETES:
      {
      /* free call record for this call */
      /* find service ID for this dialled number - there must be one */
      i = 0;
      while ((i < NUMSVCS) && (serviceArray[i].destn != dialled))
         i++;
      if (i < NUMSVCS)
         {
         freeSvcCallRecord(i, callId);
         if ((j=serviceArray[i].ACSindex) != -10
           ACSterminate(j,callId,AC_COMPLETES,time);
         else;
         }
```

-continued

APPENDIX - ACS C SOURCE CODE LISTING

```
        else
            {fprintf(stderr, "PANIC: no service found for AC_COMPLETES
event\n");exit(1);}
        break;
        }
        case AC_BUSY:
        {
        /* find service ID for this dialled number - there must be one */
        i = 0;
        while ((i < NUMSVCS) && (serviceArray[i].destn != dialled))
            i++;
        if (i < NUMSVCS)
            {
            serviceArray[i].busy++;
            freeSvcCallRecord(i,callId);
            if ((j=serviceArray[i].monConIndex) != -1)
                dripMonCon(j,time);
            else
                serviceArray[i].monConIndex = allocateMonCon(i,time);
            if ((j=serviceArray[i].ACSindex) != -1)
                ACSterminate(serviceArray[i].ACSindex,callId,AC_BUSY,time);
            else
                serviceArray[i].ACSindex = ACSallocate(i,time);
            }
        else
            {fprintf(stderr, "PANIC: no service found for AC_BUSY
event\n");exit(1);}
        break;
        }
        case AC_ABANDON:
        {
        break;
        }
        default:
        {
        fprintf(stderr, "PANIC: unknown event %d in service( )\n",event);
        exit(1);
        }
    }
}
```

What is claimed is:

1. A method of operating a communications network including steps of:
   a) maintaining, for a selected destination number which has the capacity to receive a multiplicity of calls, a count of the number of calls currently in progress;
   b) automatically updating the said count when calls are admitted to the selected destination number and when calls are terminated;
   c) storing a value for the maximum capacity of the selected destination number;
   d) when a new call is made to the selected destination number, comparing the count of the number of calls in progress and the said value for the maximum capacity and rejecting the new call when admitting the call would cause the maximum capacity to be exceeded;
   e) subsequently amending, in dependence upon the response of the network to an admitted call, the value for the maximum capacity which was stored in step (c);
   wherein the step of estimating the capacity includes:
      for a period of time monitoring the number of calls $N_C$ to the destination number which are completed, and recording the time $T_C$ taken to compensate each of the calls; and
      calculating an estimate for the capacity from the mean holding time for calls to the number which are completed, and recording the time $T_C$ taken to complete each of the calls; and
      calculating an estimate for the capacity from the mean holding time for calls to the number where the mean holding time is derived from the values of $N_C$ and $T_C$ which are recorded during the same period of time; and
   wherein the holding times of calls to the destination number have a negative exponential distribution and in step (c) the estimate of the capacity of the destination is derived from the relationship:

$$\hat{T}_H = \frac{\sum_{N_C} T_C + \sum_{N_I} T_I}{N_C}$$

where $\hat{T}_H$ is the mean holding time, $T_C$ is the time taken to finish a monitored call which has ended, $N_C$ is the number of such calls, $T_I$ is the time taken so far by a monitored call which has yet to end, and $N_I$ is the number of such calls.

2. A method according to claim 1, in which steps (a) to (d) are initiated only when congestion is detected at the destination number.

3. A method according to claim 2, in which steps (a) to (d) are carried out at a single server which serves a plurality of the said selected destination numbers, and in which resources for carrying out steps (a) to (d) are allocated on the server to a respective destination number when congestion is detected at the said destination number.

4. A method according to claim 2, in which steps (a) to (d) are carried out only when the rate of calls to the destination number is above a first, lower threshold level and is below a second, upper threshold level.

5. A method according to claim 1, in which step (c) includes:
   estimating the maximum capacity of the destination number and storing the estimated value.

6. A method according to claim 5, in which the step of estimating the capacity includes:
   for a period of time, monitoring the number of calls $N_C$ to the destination number which are completed, and recording the time $T_C$ taken to complete each of the calls; and
   calculating an estimate for the capacity from the mean holding time for calls to the number, where the mean holding time is derived from the values of $N_C$ and $T_C$ which are recorded during the said period of time.

7. A method of operating a communications network including steps of:
   a) maintaining, for a selected destination number which has the capacity to receive a multiplicity of calls, a count of the number of calls currently in progress;
   b) automatically updating the said count when calls are admitted to the selected destination number and when calls are terminated;
   c) storing a value for the maximum capacity of the selected destination number;
   d) when a new call is made to the selected destination number, comparing the count of the number of calls in progress and the said value for the maximum capacity and rejecting the new call when admitting the call would cause the maximum capacity to be exceeded;
   e) subsequently amending, in dependence upon the response of the network to an admitted call, the value for the maximum capacity which was stored in step (c);
   wherein step (c) includes estimating the maximum capacity of the destination number and storing the estimated value;
   wherein the step of estimating the capacity includes:
      for a period of time, monitoring the number of calls $N_C$ to the destination number which are completed, and recording the time $T_C$ taken to complete each of the calls; and
      calculating an estimate for the capacity from the mean holding time for calls to the number, where the mean holding time is derived from the values of $N_C$ and $T_C$ which are recorded during the said period of time; and
   wherein the holding times of calls to the destination number have a negative exponential distribution and in step (c) the estimate of the capacity of the destination is derived from the relationship:

$$\hat{T}_H = \frac{\sum_{N_C} T_C + \sum_{N_I} T_I}{N_C}$$

where $\hat{T}_H$ is the mean holding time, $T_C$ is the time taken to finish a monitored call which has ended, $N_C$ is the number of such calls, $T_I$ is the time taken so far by a monitored call which has yet to end, and $N_I$ is the number of such calls.

8. A method of operating a communications network including steps of:
   a) maintaining, for a selected destination number which has the capacity to receive a multiplicity of calls, a count of the number of calls currently in progress;
   b) automatically updating the said count when calls are admitted to the selected destination number and when calls are terminated;
   c) storing a value for the maximum capacity of the selected destination number;
   d) when a new call is made to the selected destination number, comparing the count of the number of calls in progress and the said value for the maximum capacity and rejecting the new call when admitting the call would cause the maximum capacity to be exceeded;
   e) subsequently amending, in dependence upon the response of the network to an admitted call, the value for the maximum capacity which was stored in step (c);
   wherein step (c) includes estimating the maximum capacity of the destination number and storing the estimated value;
   wherein the step of estimating the capacity includes:
      for a period of time, monitoring the number of calls $N_C$ to the destination number which are completed, and recording the time $T_C$ taken to complete each of the calls; and
      calculating an estimate for the capacity from the mean holding time for calls to the number, where the mean holding time is derived from the values of $N_C$ and $T_C$ which are recorded during the said period of time; and
   wherein the holding times of calls to the destination number are generally constant and in step (c) the estimate of the capacity of the destination is derived from the relationship:

$$\hat{T}_H = \frac{\sum_{N_C} T_C}{N_C}.$$

9. A call control server suitable for use in a communications network which comprises a plurality of interconnected nodes arranged to provide connections between terminal resources, the call control server comprising:
   a) a call counter which is assignable to a selected destination number and which is arranged to maintain a count of the total number of calls in progress to the destination number;
   b) a network signalling interface arranged to receive network signals which are generated when calls to the selected destination number are completed
   c) a counter controller which is connected to the network signalling interface and to the call counter and which is arranged, in response to the said signals received at the network signalling interface, to update automatically the count which is maintained by the call counter;
   d) a store which is programmed with a value for the capacity of the selected destination number; and
   e) a call controller which is connected to the call counter and to the store and which includes
      a comparator for comparing the value of the call counter and the value programmed in the said store; and
      a control signal generator, arranged, when completion of a new call would cause the capacity of the destination number to be exceeded, to generate a control signal to cause the new call to be rejected without the new call being routed to the destination; and wherein the call controller includes a capacity tracker which is arranged automatically to write an amended value for the capacity in the store (d) in dependence upon the response of the network to an admitted call; and wherein the capacity tracker is arranged, when the number of calls in progress is equal to the stored value for the maximum capacity, to increment the stored value for the maximum capacity, to monitor the response of the network to a further admitted call, if a BUSY signal is returned then decrements the stored value for the maximum capacity, and otherwise maintains the stored value for the maximum capacity at the incremented level.

10. A communications network comprising:
a) a plurality of interconnected nodes arranged to provide connections between terminal resources; and
b) a call control server according to claim 9.

11. A call control server according to claim 9, further comprising a congestion detector which is arranged to initialise the call counter, the counter controller and the call controller in response to a signal from the network which indicates congestion at the destination number.

12. A call control server according to claim 11, further comprising a resource allocator which is connected to the congestion detector, and which in response to the detection of congestion at a destination number allocates server resource to the respective number.

13. A method of operating a communications network including steps of:
a) maintaining, for a selected destination number which has the capacity to receive a multiplicity of calls, a count of the number of calls currently in progress;
b) automatically updating the said count when calls are admitted to the selected destination number and when calls are terminated;
c) storing a value for the maximum capacity of the selected destination number;
d) when a new call is made to the selected destination number, comparing the count of the number of calls in progress and the said value for the maximum capacity and rejecting the new call when admitting the call would cause the maximum capacity to be exceeded; and
e) subsequently amending, in dependence upon the response of the network to an admitted call, the value for the maximum capacity which was stored in step (c);
f) incrementing the stored value for the maximum capacity;
g) admitting a further call; and
h) if a BUSY signal is returned than decrementing the stored value for the maximum capacity, otherwise maintaining the stored value for the maximum capacity at the incremented level.

14. A method of operating a communications network including steps of:
a) maintaining, for a selected destination number which has the capacity to receive a multiplicity of calls, count of the number of calls currently in progress;
b) automatically updating the said count when calls are admitted to the selected destination number and when calls are terminated;
c) storing a value for the maximum capacity of the selected destination number;
d) when a new call is made to the selected destination number, comparing the count of the number of calls in progress and the sid value for the maximum capacity and rejecting the new call when admitting the call would cause the maximum capacity to be exceeded;
e) incrementing the stored value for the maximum capacity;
f) admitting a further call; and
g) if a BUSY signal is returned then decrementing the stored value for the maximum capacity, otherwise maintaining the stored value for the maximum capacity at the incremented level.

15. A method of operating a communications network including steps of:
a) maintaining, for a selected destination number which has the capacity to receive a multiplicity of calls, a count of the number of calls currently in progress;
b) automatically updating the said count when calls are admitted to the selected destination number and when calls are terminated;
c) storing a value for the maximum capacity of the selected destination number;
d) when a new call is made to the selected destination number, comparing the count of the number of calls in progress and the said value for the maximum capacity and rejecting the new call when admitting the call would cause the maximum capacity to be exceeded; and decreasing the stored value for the maximum capacity if at any time a busy signal is received in response to a calf admitted when the call counter has a value less than the stored value of the maximum capacity.

16. A call control server suitable for use in a communications network which comprises a plurality of interconnected nodes arranged to provide connections between terminal resources, the call control server comprising:
a) a call counter which is assignable to a selected destination number and which is arranged to maintain a count of the total number of calls in progress to the destination number;
b) a network signalling interface arranged to receive network signals which are generated when calls to the selected destination number are completed
c) a counter controller which is connected to the network signalling interface and to the call counter and which is arranged, in response to the said signals received at the network signalling interface, to update automatically the count which is maintained by the call counter;
d) a store which is programmed with a value for the capacity of the selected destination number; and
e) a call controller which is connected to the call counter and to the store and which includes
a comparator for comparing the value of the call counter and the value programmed in the said store; and
a control signal generator, arranged, when completion of a new call would cause the capacity of the destination number to be exceeded, to generate a control signal to cause the new call to be rejected without the new call being routed to the destination; and wherein the call controller includes a capacity tracker which is arranged automatically to write an amended value for the capacity in the store (d) in dependence upon the response of the network to an admitted call; and wherein the capacity tracker is arranged to decrease the stored value for the maximum capacity if at any time a busy signal is received in response to a call admitted when the call counter has a value less than the stored value of the maximum capacity.

17. A method of operating a communications network including steps of:
   a) maintaining, for a selected destination number which has the capacity to receive a multiplicity of calls, a count of the number of calls currently in progress;
   b) automatically updating the same count when calls are admitted to the selected destination number and when calls are terminated;
   c) storing a value for the maximum capacity of the selected destination number;
   d) when a new call is made to the selected destination number, comparing the count of the number of calls in progress and the said value for the maximum capacity and rejecting the new call when admitting the call would cause the maximum capacity to be exceeded; and
   e) subsequently amending, in dependence upon the response of the network to an admitted call, the value for the maximum capacity which was stored in step (c);
   f) incrementing the stored value for the maximum capacity;
   g) admitting a further call; and
   h) if a BUSY signal is returned them decrementing the stored value for the maximum capacity, otherwise maintaining the stored value for the maximum capacity at the incremented level.

18. A method of operating a communications network including steps of:
   a) maintaining, for a selected destination number which has the capacity to receive a multiplicity of calls, a count of the number of calls currently in progress;
   b) automatically updating the same count when calls are admitted to the selected destination number and when calls are terminated;
   c) storing a value for the maximum capacity of the selected destination number;
   d) when a new call is made to the selected destination number, comparing the count of the number of calls in progress and the said value for the maximum capacity and rejecting the new call when admitting the call would cause the maximum capacity to be exceeded; and
   e) subsequently amending, in dependence upon the response of the network to an admitted call, the value for the maximum capacity which was stored in step (c); and
   f) decreasing the stored value for the maximum capacity if at any time a BUSY signal is received in response to a call admitted when the call counter has a value less than the stored value of the maximum capacity.

* * * * *